US010428250B2

(12) United States Patent
Tichelaar et al.

(10) Patent No.: US 10,428,250 B2
(45) Date of Patent: Oct. 1, 2019

(54) METHOD FOR PRODUCING TEXTILE PRODUCTS, PRODUCTS OBTAINABLE THEREFROM AND METHOD TO RECLAIM THE PRODUCTS

(71) Applicant: DSM IP ASSETS B.V., Heerlen (NL)

(72) Inventors: Michel Poul Tichelaar, Echt (NL); Cornelis Eme Koning, Echt (NL); Jan Henderikus Udding, Echt (NL); Wilhelmina Westerhof, Echt (NL); Chris Reutelingsperger, Echt (NL); Adriaan Hofland, Echt (NL)

(73) Assignee: DSM IP ASSETS B.V, Heerlen (NL)

( * ) Notice: Subject to any disclaimer, the term of this patent is extended or adjusted under 35 U.S.C. 154(b) by 242 days.

(21) Appl. No.: 15/431,662

(22) Filed: Feb. 13, 2017

(65) Prior Publication Data

US 2017/0152417 A1    Jun. 1, 2017

Related U.S. Application Data

(62) Division of application No. 14/896,790, filed as application No. PCT/EP2014/062045 on Jun. 10, 2014.

(30) Foreign Application Priority Data

Jun. 10, 2013 (EP) .................................. 13171237
Jun. 10, 2013 (EP) .................................. 13171238
Jun. 24, 2013 (EP) .................................. 13173428

(51) Int. Cl.
| | |
|---|---|
| C08L 67/00 | (2006.01) |
| C09J 167/02 | (2006.01) |
| D06N 7/00 | (2006.01) |
| B32B 5/26 | (2006.01) |
| B32B 7/12 | (2006.01) |
| D05C 17/02 | (2006.01) |
| B32B 5/02 | (2006.01) |
| B32B 37/06 | (2006.01) |
| B32B 37/12 | (2006.01) |
| C08G 63/183 | (2006.01) |
| C09J 5/06 | (2006.01) |
| C09J 7/35 | (2018.01) |

(52) U.S. Cl.
CPC .............. *C09J 167/02* (2013.01); *B32B 5/02* (2013.01); *B32B 5/26* (2013.01); *B32B 7/12* (2013.01); *B32B 37/06* (2013.01); *B32B 37/1207* (2013.01); *C08G 63/183* (2013.01); *C09J 5/06* (2013.01); *C09J 7/35* (2018.01); *D05C 17/02* (2013.01); *D06N 7/0065* (2013.01); *D06N 7/0076* (2013.01); *D06N 7/0078* (2013.01); *B32B 2037/1215* (2013.01); *B32B 2262/0276* (2013.01); *B32B 2419/04* (2013.01); *B32B 2471/02* (2013.01); *D06N 2201/02* (2013.01); *D06N 2201/0263* (2013.01); *D06N 2203/061* (2013.01); *D06N 2203/065* (2013.01); *D06N 2213/02* (2013.01); *D10B 2331/04* (2013.01); *D10B 2403/0111* (2013.01); *D10B 2503/04* (2013.01); *D10B 2503/042* (2013.01); *Y02P 20/582* (2015.11)

(58) Field of Classification Search
USPC ................................... 528/44, 271, 272, 308
See application file for complete search history.

(56) References Cited

U.S. PATENT DOCUMENTS

| | | |
|---|---|---|
| 3,975,224 A | 8/1976 | Ruzek et al. |
| 4,849,270 A | 7/1989 | Evans et al. |
| 5,240,530 A | 8/1993 | Fink |
| 5,250,333 A | 10/1993 | McNeely |
| 5,538,776 A | 7/1996 | Corbin et al. |
| 5,556,684 A | 9/1996 | Forero |
| 5,876,827 A | 3/1999 | Fink et al. |

(Continued)

FOREIGN PATENT DOCUMENTS

| | | |
|---|---|---|
| EP | 0 747 525 | 12/1996 |
| EP | 1598476 | 7/2012 |

(Continued)

OTHER PUBLICATIONS

International Search Report for PCT/EP2014/062045, dated Sep. 2, 2014, 4 pages.

*Primary Examiner* — Terressa Boykin

(74) *Attorney, Agent, or Firm* — Nixon & Vanderhye, P.C.

(57) ABSTRACT

The present invention pertains to a method for manufacturing a laminated textile product comprising providing a first intermediate product comprising a primary backing having a front surface and a back surface, and yarns stitched into the primary backing, the yarns extending from the front surface of the backing material, feeding the intermediate product along a body having a heated surface, the back surface being pressed against the said heated surface, to at least partly melt the yarns present in the intermediate product to bond the yarns to the backing, wherein the part of the back surface that is pressed against the heated surface has a relative speed with respect to the heated surface, so as to provide a second intermediate product having a calendered back surface, providing a dimensionally stable carrier sheet or secondary backing, and connecting the second intermediate product to the carrier sheet by providing a hot melt adhesive between the calendered surface and the sheet, and pressing the sheet to the second intermediate product to form the textile product.

6 Claims, 3 Drawing Sheets

(56) References Cited

U.S. PATENT DOCUMENTS

| | | | |
|---|---|---|---|
| 8,916,142 B2* | 12/2014 | Grimaldi | A61K 8/84 424/400 |
| 2002/0032275 A1* | 3/2002 | Falcone | C08G 18/4202 524/589 |
| 2002/0134486 A1 | 9/2002 | Brumbelow et al. | |
| 2010/0112250 A1 | 5/2010 | Shelby et al. | |
| 2010/0112251 A1* | 5/2010 | Shelby | C09J 167/02 428/35.7 |
| 2010/0260966 A1 | 10/2010 | McGill | |
| 2011/0039056 A1 | 2/2011 | Mantle et al. | |
| 2013/0240117 A1 | 9/2013 | Reutelingsperger | |
| 2014/0272262 A1 | 9/2014 | Williams | |
| 2016/0136844 A1 | 5/2016 | Williams | |

FOREIGN PATENT DOCUMENTS

| | | |
|---|---|---|
| WO | 00/61853 | 10/2000 |
| WO | 2007/127222 | 11/2007 |
| WO | 2012/060698 | 5/2012 |
| WO | 2012/076348 | 6/2012 |

* cited by examiner

METHOD FOR PRODUCING TEXTILE PRODUCTS, PRODUCTS OBTAINABLE THEREFROM AND METHOD TO RECLAIM THE PRODUCTS

This application is a divisional of commonly owned copending U.S. Ser. No. 14/896,790, filed Dec. 8, 2015, which is the national phase application of international application PCT/EP2014/062045, filed Jun. 10, 2014, which designated the US and claims priority to European Patent Application Nos. 13171237.4, filed Jun. 10, 2013, EP 13171238.2, filed Jun. 10, 2013, EP 13173428.7, filed Jun. 24, 2013, the entire contents of each of which are hereby incorporated by reference.

The present invention relates to textile products for use in applications such as floor coverings (e.g. carpets, carpet tiles, rugs and mats), to their manufacture and to methods for reclaiming these products.

Textile products used to cover floors (e.g. as carpets) are commonly produced by stitching a yarn onto a first material to form a yarn bearing layer having tufts of yarn protruding from a top surface. The yarn bearing layer is typically impregnated with a latex of a cross-linkable polymer. After the latex polymer has been impregnated into the product the latex is cross-linked to anchor the yarn tufts in place permanently. The combination of yarn, first material and latex has often previously been referred in the prior art as a primary layer (also as a primary backing and/or primary mat). To improve mechanical properties such as dimensional stability of the resultant textile product a second layer of a carrier material has been used (also previously been referred to in the prior art as a secondary layer and/or support sheet) and is typically glued to the back side of the primary layer to form a laminated textile product with the desired properties.

Hot melt adhesives (HMA) have been used to bind the primary and secondary layers in roll carpets since HMA are relatively inexpensive and readily available.

Typically the primary layer, secondary layer and adhesive joining them, each comprise very different materials with different mechanical properties as they are designed to perform different functions.

Using a cross-linkable latex to prepare the primary layer has various disadvantages such as some or all of those described below.

If the latex polymer is water-based the textile product may have low water resistance and moisture can permeate the product. This increases the risk of mildew and moulds forming which can degrade the product. Furthermore, residual monomer traces, often present in the latex polymer, can also reduce air quality which is an environmental hazard. Thus where a latex-based floor covering is exposed to high humidity, for example when used in lobbies or bathrooms, the floor covering may need to be replaced frequently.

Alternatively if the latex is for example a hydrophobic polymer dispersed in water with surfactants, the presence of surfactants may also increase the sensitivity of the product to moisture. Some latexes may contain styrene (e.g. as styrene butadiene rubber (SBR)) which can result in undesirably high amounts of residual styrene in the product. For environmental and other reasons it is preferred that the amount of volatile organic compounds (VOC) in textile products is as low as possible As latex-based textile products use dissimilar materials for the components within the primary layer and the secondary layers, each of these components would need to be separated if they were to be recovered and reused. However the yarn and first material are strongly embedded in the chemically cross-linked (e.g. vulcanised) latex adhesive. Thus in a latex based textile product the components of the primary layer are not easily separated. Although some reclaim technologies have been developed to address some of these issues, such methods are expensive and do not allow complete reclaiming of all the materials used. As a result it is impractical to reclaim latex-based textile floor coverings and these are simply discarded, burned or shredded. Shredded floor coverings are typically deposed of in landfill and as the cross-linked latex is not biodegradable to any great extent, the shredded remains will be present for many years.

To address some of these issues various synthetic polymers such as polyolefins and polyurethanes have been developed to replace latex polymers in textile products. Such replacements have not been completely satisfactory.

Some of these and other prior art carpets which attempt to solve the aforementioned problems are described in the following documents.

EP747525 (BASF) describes a recyclable carpet prepared from a backing comprising protruding tufts (preferably of the same material as the backing), with a carrier of a thermoplastic substrate bound to the backside of the primary backing with hot melt adhesive (HMA). The backing and tufts are made from materials such as nylon, polyolefin and/or polyester and thermoplastic carrier from materials such as polyolefins, ethylene vinyl acetate (EVA) and/or polyvinyl chloride (PVC). The HMA is applied to the back surface of the primary backing to lock the tufts in place and to act as a buffer between the backing and carrier, so is selected to be compatible with the polymers of the backing and of the carrier. A preferred HMA is caprolactam-based copolyamide, although compatible polyolefins and/or copolyester adhesives may also be used. The carpet may be recycled by heating to a temperature sufficient to (re)soften the HMA but below the melting point of the polymers of the tufted backing and carrier substrate so the carpet separates into its two constituent layers.

U.S. Pat. No. 3,975,224 (Lutravil Spinnvlies) discloses a method for making a non-woven web used as a dimensionally stable reinforcing and backing material for needle-punched and tufted carpets. The web has a relative grab-tensile strength of at least 200 p/g/m$^2$, a breaking extension of no more than 50% and a shrinkage of no more than 1% at 160° C. The non-woven web comprising rows of parallel linear bundles of matrix filaments and binder filaments. The matrix filaments are of a melt spinnable polyester preferably polyethylene terephthalate. The binder filaments are of a melt spinnable polymer having a melting point above 160° C. and 30° below that of the matrix filaments. Suitable binder polymers are stated to be: polyamides or copolyamides (such as polycaprolactam or a copolyamide of polycaprolactam and polyhexamethylene adipamide); polyesters or copolymers (such as polyethylene terephthalate/isophthalate, polyethylene terephthalate/ethylene adipate or quaternary copolyesters of terephthalic acid, isophthalic acid, ethylene glycol and 1, 4-cyclohexane diethanol); isotactic polyolefins (such as isotactic polypropylene) and linear polyurethanes.

U.S. Pat. No. 5,240,530 (Tennessee Valley Performance Products) describes a recyclable carpet having a primary backing comprising protruding tufts of synthetic fibres which is heated to fuse the primary backing to a secondary backing of an extruded sheet made from for example from an isotactic polyolefin. The primary and secondary backing and fibres may all comprise thermoplastics. This reference teaches the reader directly not to use either conventional latex adhesives or hot melt adhesives as both are stated to "prevent carpet from being recycled" (col. 4, lines 16 to 17).

U.S. Pat. No. 5,538,776 (Hoechst Celenese) describes a recyclable thermoplastic tufted carpet made of a primary backing with tufts and a secondary backing attached to the primary with a layer of a polyester hot melt adhesive. The HMA takes the place of latex adhesive (see col. 2, lines 50 to 51) and the tufts, primary backing, the HMA and secondary backing are made from one type of thermoplastic (preferably polyester). So the carpet can be recycled through known methods, such as processes to recycle polyesters by glycolysis or methanolysis. However these carpets will not have good mechanical properties as the tufts will not be sufficiently strongly anchored to the carpet as in the absence of latex adhesive the HMA on its own will not provide a sufficiently good bond.

US2010-0112250 (Eastman Chemical) describes hot-melt adhesives (HMA) prepared from polyesters containing 1,4-cyclohexane-dicarboxylic acid as a diacid component and a diol component containing at least two diols chosen from 1,4-cyclohexane dimethanol, triethylene glycol and diethylene glycol. These HMAs are described as suitable for applying to labels, for example as seaming adhesives for roll applied labels. There is no suggestion in this document that these polyesters would be suitable for use in preparing textile products such as carpets.

US2010/0260966 (Beaulieu Group) discloses a dimensionally stable carpet tile with a non-woven cushion material that incorporates a stabilizer. The stabilised cushion material is attached to a face fabric using a layer of polymer adhesive. Examples of suitable polymer adhesives are given as: PVC, polyethylenes, modified polypropylenes, ethyl vinyl acetates, modified PETs and blends thereof. In one embodiment the stabilised cushion material, face fabric and adhesive are laminated together by suitable methods such as extrusion, hot melt or belt lamination. However whichever method of attachment is used, to ensure adequate bonding between the cushion material and face fabric the polymer adhesive must penetrate both to a substantial extent. This makes recycling of the carpet tile very challenging as its constituent polymer materials are incompatible and cannot be recycled together and are still very difficult to separate.

US2011/039056 (Interface International) discloses a carpet which comprises an adhesive which can lose its adhesive function by treatment with a heated solvent (such adhesives are referred to as 'hot aqueous solvent switchable adhesives"). Preferably the switchable adhesive is a plasticized esterified expanded starch. Producing carpets with such switchable adhesives allows the adhesive to be switched off and carpet components to be separated for easier recycling. However such adhesives may not be especially strong and if starch-based may be susceptible to water and provide low moisture resistance.

WO2007/127222 (Mohawk Industries) describes use of hot melt adhesives (HMA) to prepare laminated carpet tiles. The tiles have a tufted face yarn, a primary backing, a pre-coat layer of a HMA and at least 20% by weight of tackifying resin and at least two solventless layers. Preferred pre-coat layers have 2 to 80% by weight of polyethylene and 20 to 98% by weight of tackifier. These laminated tiles have a complex multi-layer structure which makes them expensive to produce. To achieve a strong bond between these layers it requires the hot melt adhesive to be substantially impregnated within the other materials, and thus separating the component parts is difficult and these tiles are not easily recyclable.

EP1598476 (Klieverik Heli) describes a method for manufacturing a backing as an intermediate for making a carpet, where the backing does not use a latex to anchor the fibres (yarn) in place. The backing comprises a sheet with piles of thermoplastic fibres stitched through the thickness of the sheet and protruding from its upper surface. The backing is fed (fibre upwards) along a heated roller surface and its underside is pressed against the roller so the fibres will melt. Klieverik states that after cooling the fibres are firmly anchored to each other and the backing without the need for a latex polymer. One embodiment teaches that a thermoplastic adhesive (such as hot melt adhesive) may be applied additionally as a powder to the underside of the backing so the heated surface melts the fibre and adhesive together to create a good adhesion between the piles, the adhesive and the backing. In another embodiment pressure may be applied after heating (e.g. by a pressure roller) to the backing and piles in a direction perpendicular to the backing surface (i.e. from below) to smear the plasticised fibres together to enhance their mutual adhesion, thus allowing the heated roller to be held at a lower temperature, below that at which the fibres would fuse by heat alone. This method provides the advantage that the intermediate backing can be easily recycled as the fibre and backing sheet can be made from the same polymer. There is no incompatible latex penetrated into the fibre piles. There is also saving in energy and raw material costs compared to prior art methods. However, this method still has some disadvantages. The fibre is still insufficiently strongly anchored to the backing for use in many applications, for example where fibre is subjected to high mechanical loads (e.g. in the interior of cars, trains, planes, offices, shops etc.). Thus in practise to make carpets from the intermediate backings described by Klieverik it will still be necessary to apply additional (incompatible) adhesive or latex to the underside of the backing to and/or extensively impregnate HMA within the carpet piles and backing to provide sufficient adhesion with HMA alone. The presence of such incompatible materials and/or embedded HMA will mean that such carpets are difficult to recycle.

WO 2012/076348 (Niaga) describes a method for making textile products that improves the anchor strength of the yarn. In this method when the first yarn bearing sheet is pressed against the heated surface, the relative speed of the sheet and surface are adjusted to provide an additional mechanical force between them in the machine direction (see below) which spreads the material of the yarn whilst it is still molten resulting in a stronger bond between the intermediate product and the yarn. Though in theory in many cases an additional secondary support layer may no longer be necessary, this document does teach that such a support layer may still be useful, especially if it comprises a reactive adhesive relying on thermally reversible reactions between reactive molecules present at the interface between the textile product and the carrier material. Such reactive adhesives provide a much stronger bond than is typically achieved by other types of adhesives such as hot melt adhesives (HMA). However, whilst use of reactive adhesive provides a strong bond and can be recycled (unlike the latex) its use still leads to a textile product that does not have optimal mechanical properties. A further disadvantage of using a chemically reactive adhesive is that both the components to be joined and the adhesive must carry co-reactive groups. Thus the polymer used to prepare the primary backing and/or tufts is likely to require chemical modification in an additional step as standard commercial polymers may not contain the required functional groups to be suitable for use with reactive adhesives.

WO2000-61853 (Polyloom Corp.) describes a carpet in which the underside of a primary backing is heated to integrally fuse individual fibres of back loop portions of the yarn together to form a carpet base (also referred to as greige goods) to which is then applied a coating of a thermoplastic polyolefin polymer with recurring polar moieties (polar TPP). The polar TPP coating adheres or integrally fuses substantially all the fibres in the back loops. One example of a polar TPP is a maleic anhydride modified polypropylene. The method of attachment of the yarn tufts described by Polyloom is different from that of the present invention. Polyloom does not teach or appreciate the advantages of applying a force in the MD to the yarns when molten to flatten the backside surface and improve adhesion of coatings thereto. As a result Poyloom's griege goods still have an uneven rough and not flat underside surface that comprises yarn loops and knots which would not achieve a very good bond with any coatings applied thereto. Thus in contrast with the present invention a strong adhesive coating of polar TPP must be used. The TPP coating is very different from HMA. This document extensively describes (on page 9 line 3 to page 11 line 9) some alleged problems with using hot melt adhesives (HMA), which include their very low tensile strength compared to olefin copolymers and their increase of viscosity as they cool on application to the carpet. Thus a reader of this document is taught strongly away from using any HMA to prepare carpets and is even less likely to use HMA as the sole adhesive to attach a backing layer to a primary layer to form a carpet.

U.S. Pat. No. 5,876,827 (Polyloom) describes a similar carpet to that of WO2000-61853 which comprises polypropylene yarn heat fused to a polypropylene primary backing in a similar manner to that already described in WO2000-61853. This document also explains the alleged disadvantages of using HMA (see col. 2 lines 42 to 65) and indeed explicitly states that "hot melt adhesive carpet are not readily recyclable' (col. 2 lines 57 to 59) which teaches directly away from carpets of the present invention.

WO2012-060698 (Interface) describes a method for making carpet tiles in which the tufted yarns are thermally fused to a support material and a layer of reinforced non-woven material is added to improve dimensional stability of the tile. The application states there are disadvantages to precoat a tufted later with latex, adhesive or HMA (see page 1, lines 19 to 28) and so also teaches away from carpets of the present invention.

Thus it can be seen than current methods for manufacturing textile products and the products made by them have the various disadvantages described herein. For example current manufacturing methods produce textile products that do not readily resist a very high mechanical load, with an increased risk of yarns being torn out of the product during use; have non-optimal mechanical properties and/or are difficult to reclaim completely. Preferably it would be desirable to have a reclaimable textile product with optimal mechanical properties where the yarn is strongly anchored therein.

It can also be seen that hot melt adhesives (HMAs) were believed to have a particular disadvantage for use in carpets. Below their solidification temperature HMAs are usually brittle and tend to tear or break under mechanical impact resulting in the first (yarn-bearing) material detaching from the carrier material. The different materials in the textile respond differently to their environment (e.g. expand differently on exposure to heat or moisture) which can also induce further stresses in the HMA leading to detachment of the carrier material. Thus it has been believed that for HMAs to provide a sufficient bond they must be well impregnated within the textile product to overcome this problem and provide good tuft adhesion. Such impregnated structures were difficult to recycle as then their constituent components were difficult to separate. Therefore there has not been widespread use of HMAs as a replacement for adhesives in textile flooring as the resultant products were believed either to be not very durable if easily recyclable or if sufficiently durable then difficult to recycle.

It is therefore surprising that a textile product can be prepared using a hot melt adhesive that provides a sufficiently strong and durable anchor for the yarn under high loads and yet also enables the product to be easily recycled.

It is an object of the present invention to solve some or all of the problems identified herein, for example by mitigating some or all or the disadvantages of prior art methods and textile products.

Therefore broadly in accordance with the present invention there is provided a method for manufacturing a textile product, the method comprising the steps of:
 (a) providing a first intermediate product comprising a backing having a front surface and a back surface, and yarns stitched into the backing, the yarns extending from the front surface of the backing material,
 (b) feeding the first intermediate product along a body having a heated surface, the back surface being pressed against the said heated surface, to at least partly melt the yarns present in the intermediate product to bond the yarns to the backing,
wherein the part of the back surface that is pressed against the heated surface has a relative speed with respect to the heated surface, so as to provide a second intermediate product having a calendered back surface,
 (c) providing a dimensionally stable carrier sheet, and
 (d) connecting the second intermediate product to the carrier sheet by providing a hot melt adhesive between the calendered surface and the sheet, and pressing the sheet to the second intermediate product to form the textile product.

The method of the invention provides a textile product with yarn anchored therein.

Preferably in step (a) the yarns are fastened temporarily to the first intermediate product. Optionally the yarns of the first intermediate product may additionally extend from the back surface of the intermediate product. Thus the yarns may extend from both the front and back surfaces.

It is preferred that the steps in the method of the invention are performed sequentially in the above order and/or with some or all of these steps being performed together simultaneously.

Usefully the textile product is manufactured from one or more sheets (including for example continuous webs fed from a roll) that pass through a machine. Conventionally the longitudinal direction (LD) is the direction in which the sheet(s) pass through the machine (also known as the machine direction or MD) and the transverse direction (TD) (also known as the tangential direction) is perpendicular to MD in the plane of the sheet. Therefore in step (b) it is preferred that a mechanical force on the molten fraction of the yarns is applied in the longitudinal direction and/or transverse direction, preferably in the longitudinal direction. The mechanical force may be applied by any suitable method or device (for example any known to those skilled in the art) and be applied simultaneously and/or sequentially in each of two mutually perpendicular directions (e.g. MD and/or TD) for example by the method described in WO 2012/076348, by a stenter, by draw rolls and/or by any combinations thereof.

In step (b) the molten fraction of the yarns is spread across the back surface of the intermediate product (preferably in the MD) sufficiently to provide a smooth surface on those parts of the back surface where the molten yarn has been spread to act as a good base for applying hot melt glue to attach the carrier sheet.

Thus in one embodiment of the method of the invention, the back surface of the intermediate product is calendered in whole or in part and adhesive is provided by applying molten adhesive on the calendered back surface which has temperature above the melting temperature of the hot melt adhesive when the adhesive is applied.

In another embodiment of the method of the invention an intermediate product is obtained from step (a), the product being a primary backing sheet to which the yarns are not yet strongly bound to the sheet (i.e. are temporarily attached). In a further embodiment (optionally as preferred feature of the previous embodiment) of the method of the invention, a primary mat sheet is obtained as the product of step (b) where in the primary mat sheet the yarns are strongly bound to the sheet (i.e. permanently attached) by respectively thermal treatment and/or by adhesive optionally so that the yarn tufts protrude from the first (e.g. front) surface of the primary mat sheet.

In a further aspect of the invention there is provided a textile product obtained and/or obtainable by a method of the invention.

In accordance with a yet other aspect of the present invention there is provided a textile product obtained and/or obtainable by a method of the present invention.

Preferred textile products are substantially reclaimable (e.g. recyclable).

In another embodiment of the present invention the intermediate product of step (a) is a primary backing sheet where the yarns are temporarily attached to the sheet.

In yet another embodiment of the present invention the product of step (b) is a primary mat sheet where the yarns are permanently attached to the sheet by respectively thermal treatment and/or adhesive, preferably by both.

The applicant has surprisingly found that when polyester carpets of the present invention (that is carpets that consist only of polyester components) are recycled to produce polyester material, such as pellets, the resultant polyester materials has surprisingly advantageous properties which makes the material particularly suitable for recycling. Without wishing to be bound by any theory it is believed that the presence of hot melt adhesive polyester in the recycled polyester material may reduce viscosity which aids melting of the polyester when it is used to make a recycled product. This recovered polyester has improvements over recovered polyester obtained from other conventional sources such as by recycling polyethylene terephthalate (PET) e.g. from PET bottles.

Thus a still other embodiment of the present invention comprises a method for recovering polyester material from a textile product that comprises polyester fibre and a polyester hot melt adhesive (polyester HMA textile product), the method comprising the steps of:

a) heating the polyester HMA textile product to melt and/or soften the polyester;
b) extruding the polyester from step a) to form an extrudate; and
c) shredding the extrudate from step to form a recovered polyester material.

Preferably in step c) the recycled polyester material forms pellets having a mean maximum linear dimension of from 500 micrometers (μm) to 10 mm, Preferably the polyester HMA textile product used in step (a) of the recovery method of the invention is a textile product of the present invention. More preferred polyester HMA textile products for use in the recovery method comprise polyester fibres which are fused together on one side; polyester hot melt glue and optionally at least one polyester support layer(s). Even more preferred textile products for use in the recovery method of the invention are those that are substantially free of non-polyester components; most preferably consist of polyester.

Optionally the recovered polyester material of the invention can be used to prepare a polyester textile product (such as those textile products of the invention) and/or polyester component of a textile product (such as polyester fibres, polyester support layers and/or polyester hot melt adhesives).

Generally the recovered polyester of the invention will be strongly coloured, even black due to the presence of impurities. For many applications (e.g. carpet support layers) thus is not an issue and the recovered polyester may be used directly. However for some applications a colourless or weakly coloured material is preferred (e.g for polyester carpet fibres which may optionally be coloured) in which case a further step d) of decolourisation (e.g. by use of oxidising or bleaching agents) may be added to the recovery method of the invention to obtain a decolourised polyester material.

It will also be appreciated that the recovered polyester may be used in other applications of polyester such as to make PET, e.g. for use in bottles and/or as components to make diapers.

Preferred textile products of the invention are substantially free of (more preferably free of) styrene block copolymers and/or rubber-based adhesives (such as SBR or SBS), Most preferred textile products of the invention are free of any polymer latex, for example any cross-linked polymer latex.

Conveniently textile products of the invention are not substantially impregnated with HMA, i.e. are substantially free of (more conveniently free of) embedded HMA.

Usefully textile products of the invention are substantially free of (more usefully free of) chemically reactive adhesive.

The term "embedded" when used herein in relation to component materials used to prepare a textile product (e.g. in relation to HMA) denotes that the specified material (such as HMA) has been substantially impregnated within the structure of the intermediate product, carrier sheet and/or yarn fibres, for example is located in the interstices and/or voids within the sheets and yarn. Thus a non-embedded material (for example non-embedded HMA) denotes a material which is not widely impregnated having no more than 20%, preferably no more than 10%, more preferably no more than 5%, most preferably less than 1% by weight of the total amount of that material (such as HMA) present in the textile product embedded within the sheets and yarn as described above. Thus without being bound by any theory it is believed that for example non-embedded HMA forms a substantially continuous adhesive film at a surface of either or both sheets and/or forms a discrete layer between them. The presence or absence of embedded material (such as embedded HMA) can readily be determined by any suitable methods (such as by visual inspection, e.g. microscopy of a cross-section taken through the textile product).

Conveniently the intermediate product described herein may be a sheet and/or a web in which case the manufacturing process may be continuous for example using a roll of the first yarn-bearing sheet to form a web of textile product which may then be wound onto a roll. Alternatively if a sheet, these may be cut into a pre-defined length in which case the manufacturing process may be a batch process producing many (optionally flat) sheets of textile product of the desired size.

In step (a) the yarns may optionally be attached temporarily which denotes that the yarn is not bonded sufficiently for use in the desired end application of the textile product (such as a floor covering) and so at least in theory the yarn and the intermediate product could readily become separated.

Preferred methods of attachment that are temporary are mechanical attachment methods, more preferably any methods in which yarns are joined to the intermediate product by an interweaving-like method, even more preferred methods being selected from tufting, knitting, sewing, weaving and/or stitching, most preferably stitching where the yarn is fastened or joined with stitches. Mechanical attachment methods exclude other more permanent and irreversible methods to keep the yarns in place such as gluing, melting and/or chemically reacting.

The term fastener as used herein (for example to describe textile products of the invention) denotes any suitable method of attachment which may or may not be permanent or temporary and may comprise mechanical, chemical, adhesive and/or any other suitable methods and/or any combinations thereof for example any suitable methods known to those skilled in the art.

The method of heating in step (b) may comprise any suitable method as well as thermal heating (for example by a heated roller) such as heating by irradiation with suitable electromagnetic and/or particulate radiation e.g. using ultrasound and/or infrared radiation. The heating and the pressure may be provided by the same method and/or device (e.g. an optionally heated pinch or nip roller). The heating may also be provided by pressure and/or irradiation alone without using a separate thermal input such as a heater. In one embodiment of the invention the absence of a separate thermal heater has the advantage of significant savings of energy and compactness in the machinery used in the process of the invention.

In another embodiment of the invention in step (b) the heating is preferably achieved with a hot surface (such as a heated roller), alternatively or additionally the heating is also achieved in whole or in part by applying a mechanical force between to the yarns and the intermediate product to spread the yarn and enhance bonding. In step (b) optionally the sheet may be fed onto a heated surface at a speed different from the heated surface which imparts said mechanical force. In a preferred embodiment of the invention where the heater comprises a heated roller than the pressure may be applied in whole or in part by a pressure roller run at a different speed relative to that of the heated roller, for example as described in WO 20012-076348.

In step (b) the pressure may be applied in whole or in part by a pressure roller and optionally heating and pressure may applied simultaneously. Preferably the heating and pressure are applied by the same roller which may calendar the intermediate product.

The intermediate product (which in some embodiments herein may be a primary matt sheet) of the present invention has yarns/tufts fixed to it by the heating process b) and performs a function similar to the primary layer of a conventional textile product as described herein. A dimensionally stable carrier sheet is applied to the back surface of the intermediate product and the hot melt adhesive (HMA) is applied between intermediate product and carrier sheet which may be pressed together to form a laminated textile product. Preferably the HMA is the only adhesive used to glue the intermediate product and carrier sheet together and no further adhesive is needed.

In a further embodiment of the present invention there is provided a method for manufacturing a laminated textile product comprising providing a first intermediate product comprising a backing having a front surface and a back surface, and yarns stitched into the backing, the yarns extending from the front surface of the backing material, feeding the intermediate product along a body having a heated surface, the back surface being pressed against the said heated surface, to at least partly melt the yarns present in the intermediate product to bond the yarns to the backing, wherein the part of the back surface that is pressed against the heated surface has a relative speed with respect to the heated surface, so as to provide a second intermediate product having a calendared back surface (i.e. at least at the sites where the yarns are melted; the back surface material of the backing itself is not necessarily calendared), providing a dimensionally stable carrier sheet, and connecting the second intermediate product to the carrier sheet by providing a hot melt adhesive between the calendared surface and the sheet, and pressing the sheet to the second intermediate product to form the textile product.

It is preferred that textile products of the invention are substantially free of (preferably free of) latex polymers. As used herein latex polymer denotes any polymer that consists of a polymer dispersed in an aqueous phase. Typical latex polymers that can be used as adhesives include acrylic emulsions (often used to prepare pressure sensitive adhesives (PSA), styrene block copolymers and/or rubber-based adhesives, for example styrene butadiene rubber polymers (SBR), styrene-butadiene-styrene (SBS) and the like. Latex polymers have been used in the prior art to anchor yarn to the primary layer and/or to improve dimensional stability but have the disadvantages described previously and are no longer needed to prepare the textile products of the present invention which may thus have the further optional advantage that they need not contain any residual styrene. Thus preferably the textile products of the invention are substantially, more preferably completely recyclable.

The absence of latex polymers may also reduce the amount of volatile components in the textile product which has environmental and other advantages. Therefore in a further embodiment usefully textile products of the invention have a low VOC content, more usefully are substantially free of VOC, As used herein VOC denotes volatile organic compounds (VOC) that have a high vapour pressure under standard conditions, preferably those compounds with a boiling point from 50 to 250° C. The term "low VOC" as used herein denotes that the amount of VOC present in a liquid composition or resin is less than 100 g/l, preferably <50 g/l (same values per kg if it concerns a solid material).

Another embodiment of the invention prepared by a method of the invention relates to substantially completely recyclable (preferably completely recyclable) textile products comprising a backing having yarns applied therein (forming the upper surface of the textile product) and fixed thereto by melting the yarn, which yarn is further fixed to the backing by applying a hot melt adhesive to the reverse side of the backing (without any further sheet) to form an non-laminated dimensionally-stable textile product.

A yet other embodiment of the invention prepared by a method of the invention relates to a substantially completely recyclable (preferably completely recyclable) laminated textile product comprising a backing having yarns applied therein (forming the upper surface of the textile product) and fixed thereto by melting the yarn, which backing is laminated to a dimensional stable carrier sheet using a hot melt adhesive to form a laminated dimensionally-stable textile product.

Broadly another aspect of the present invention provides a textile product obtained and/or obtainable by the method of the invention, preferably a textile flooring covering, more preferably selected from carpets, carpet tiles, rugs and/or mats, most preferably a carpet, for example a non-woven tufted carpet. Optionally the textile products of the invention may be non-laminated (e.g. where the first and/or primary matt sheet is a single backing sheet with yarns and/or tufts bonded thereto and there is no second support sheet) or may be laminated (e.g. where the first and/or primary matt sheet comprises a primary backing sheet with tufts and/or yarns bonded thereto and at least one support sheet is attached thereto, e.g. by adhesive).

Preferred textile products of the invention are substantially free of (more preferably completely free of) any chemically cross-linked (e.g. vulcanised) latex adhesive.

Useful textile products of the invention are substantially reclaimable, more usefully recyclable, and most usefully completely recyclable, by conventional recycling methods.

A yet other aspect of the invention provides a method to recycle a textile product of the invention, this method comprising the steps of:
  a) providing a used textile product according to the invention,
  b) heating the product to a temperature above the melting temperatures of the constituent polymers of the textile product; and
  c) reusing the resultant polymer melt.

A still yet other aspect of the invention provides a method to recycle a laminated textile product of the invention, this method comprising the steps of:
  a) providing a used laminated textile product according to the invention,
  b) heating the product to a temperature above the softening temperature of the hot melt adhesive but below the melting temperatures of the constituent polymers of the intermediate product and the carrier sheet of the textile product; and
  c) de-connecting the intermediate product from the carrier sheet and collecting each to be reclaimed separately.

Without wishing to be bound by any theory or speculation described herein not of which should be considered to limit the scope of the present invention in any way, the applicant provides below some possible explanations for the effects observed with the present invention.

It had previously been thought that using a hot melt adhesive on its own would not create good mechanical properties given the usually brittle nature of such an adhesive. Surprisingly the applicant has found that when the primary backing, having yarns stitched therein, undergoes a fibre-binding process (such as described in WO 2012/076348) then a very strong and mechanically durable bond can be created using a hot melt adhesive to join the primary sheet with a carrier sheet. Even more surprisingly the applicant has found that yarn appears to bind even more strongly to the primary backing than with a reactive adhesive (a preferred adhesive of WO 2012/076348). This is unexpected as it had previously been thought that hot melt adhesives generally produce relatively weak bonds (based on Van der Waals forces or hydrogen bonding) compared to reactive adhesives that adhere using covalent bonds.

The applicant believes that the presence of a hot melt adhesive especially those HMA described herein (and optionally a stable carrier sheet) may act on its own to improve the mechanical stability of the textile product of the invention and thus avoid the need for an adhesive latex to impart good mechanical stability and also sufficiently anchor the yarn. Thus without any latex adhesive the textile products of the invention are more easily separated into the constituent components and can be readily recycled.

The improved resistance of the hot melt adhesive to mechanical impact (which does not suffer from the brittle nature of solidified hot melt adhesive) may also be related to size of the adhesive layer which for example when applied to a primary surface that has been heat and pressure treated (calendared) can then be applied more thinly. A thin layer may apparently be more flexible and may minimise problems related to brittleness. However this explanation may not be correct and the precise reason for the observed effects is as yet unknown.

It is surprising that the HMA performs better than a reactive adhesive in the textile products of the invention. The applicant does not wish to be bound by any theory why in the present invention the hot melt adhesive provides a stronger bond than a reactive adhesive. Nevertheless one reason might be that HMA can more easily penetrate and impregnate the fibres than a reactive adhesive and HMA does not need to make very close contact with the primary matt sheet material at the molecular scale that would be required for the co-reactive components of a reactive glue to form covalent bonds. The fibre-binding process described in WO 2012/076348 was thought to produce a completely smooth surface, and a more detailed explanation for the surprising performance of HMA could be due to the applicant's observation that in fact this process still leaves inherent discontinuities in the back surface of the backing material. If this hypothesis is correct, then when yarn is applied in a discontinuous region (which might be indicated typically by lanes of tufted yarns) then as the yarn melts, an abrupt phase change could be created between the yarn material and the back surface (this would also explain the Zebra stripe patterns typically seen) which would enlarge the distance between the co-reactive materials and prevent their reaction. The boundary of such an abrupt phase change may also increase the mechanical tension when the textile product is under mechanical load (especially if the textile is being deformed). If a hot melt adhesive is applied to the back surface it is believed this may better penetrate these regions of abrupt phase change than other adhesive types (e.g. reactive adhesives, for which direct contact at the molecular level is required to make the chemical reaction to happen). Thus use of HMA may spread the mechanical forces over a larger area and may reduce the local tension experienced in these regions which could then account for the HMA imparting improved resistant to mechanical loads (i.e. forming a strong bond).

The invention is illustrated by the following non-limiting figures where:

Figure 4:
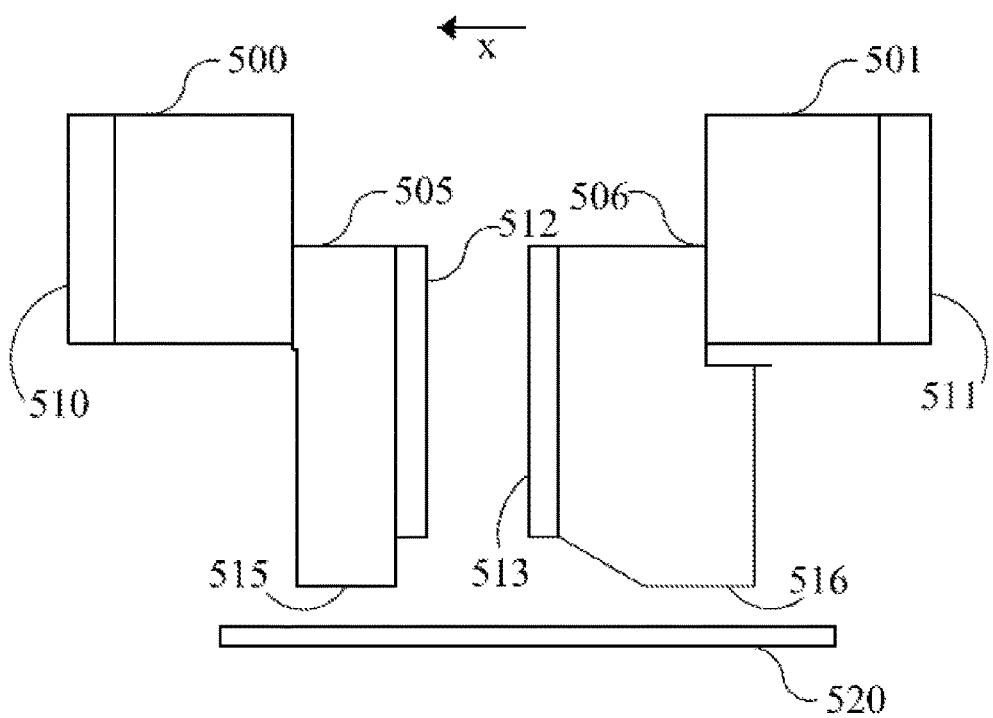

FIG. 4 schematically represents a configuration for applying a fibre-binding process in line with the process as described in WO 2012/076348.

Figure 5:
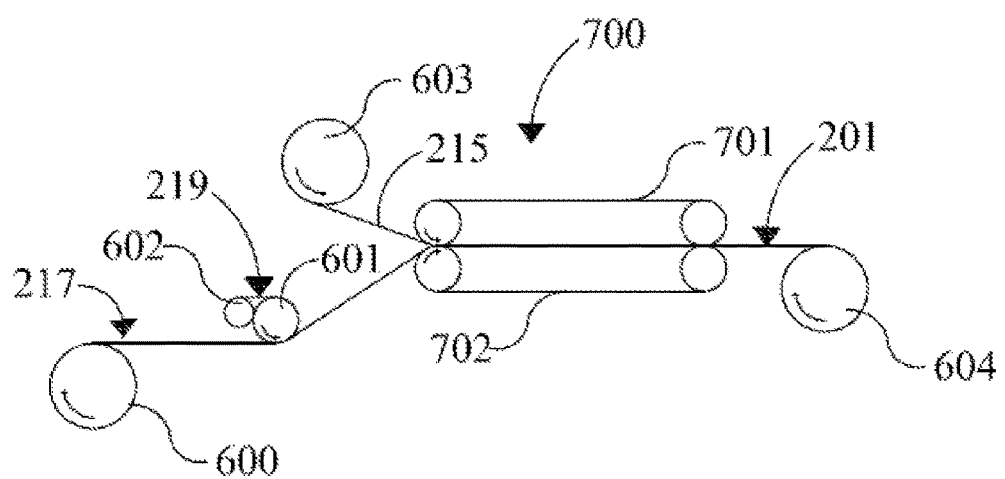

FIG. 5 schematically represents a configuration for applying a carrier sheet, in this case a dimensionally stable polyester sheet, to the back of the 100% polyester product that is produced with a method as described in conjunction with FIG. 5

Figure 1:
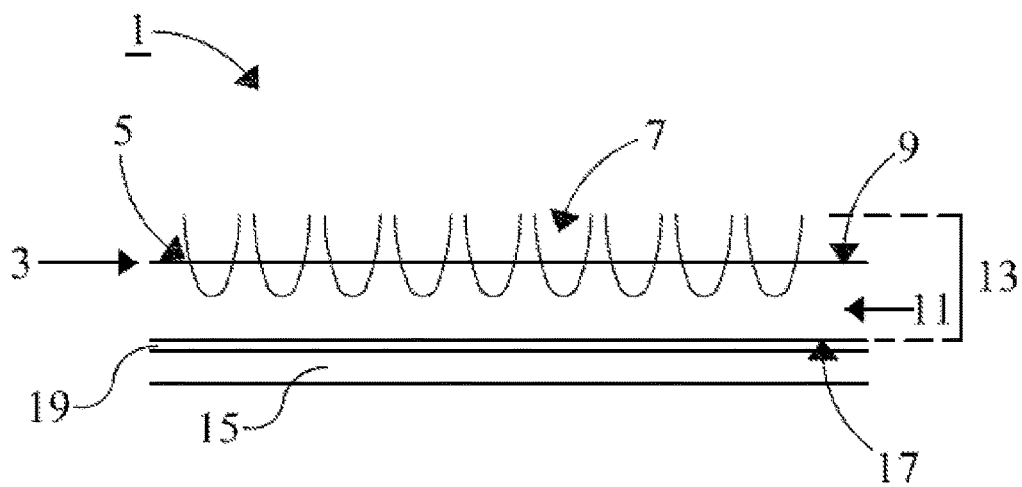
FIG. 1 shows a cross-section through a prior art a latex-based carpet which is not recyclable.

A typical prior art non-recyclable latex-based carpet is shown in FIG. 1. The carpet (1) has a primary backing (3) made from materials such as polypropylene (PP). The primary backing has holes (5) therein through which tufts (7) are mounted and protrude from a front surface (9). The tufts are glued to the primary backing by a cross-linked latex adhesive (11) to form a tuft matt (13). A secondary support carrier (15) made from materials such as PVC or PET is glued onto the back side (17) of the tuft matt using a layer of additional adhesive (19) which may be a latex adhesive or could also be a solid thermoplastic glue.

The tufts (7) are fixed strongly to the matt (13) due to the penetration of the latex adhesive (11, 19) throughout the carpet (1), but this also makes the carpet impossible to recycle as the incompatible latex (11, 19) cannot be separated from the backing, tuft and carrier components (3, 7, 15) of the carpet.

Figure 2:
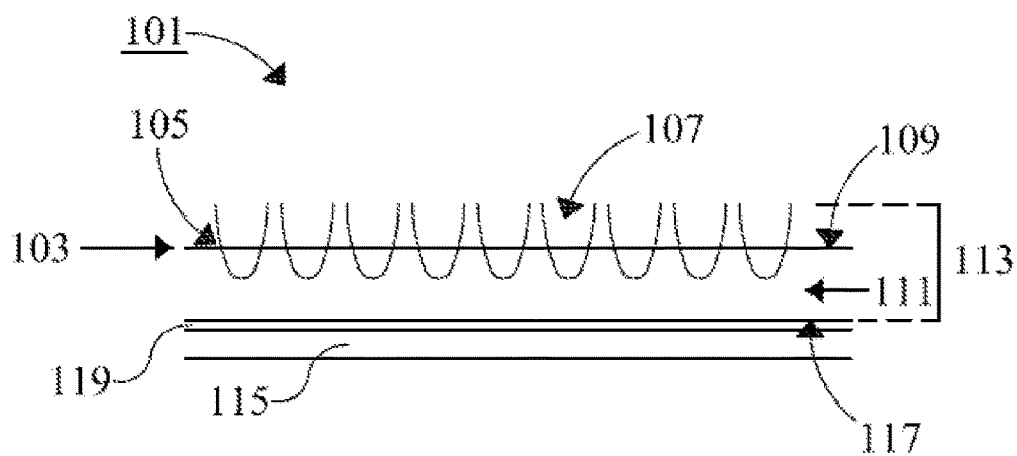
FIG. 2 shows a cross-section of a prior art recyclable carpet with poor tuft anchoring.

A recyclable prior art carpet made using hot-melt adhesive (HMA) is shown in FIG. 2. The carpet (101) has a primary backing (103) made from HMA compatible materials such as polyester (PE). The primary backing also has holes (105) therein through which protruding tufts (107) are mounted on the front surface (109). The tufts are glued to the primary backing by a HMA (111) such as a polyester hot melt glue to form a tuft matt (113). A secondary support carrier (115) made from a thermoplastic materials such as polyester is glued onto the back side (117) of the tuft matt using a layer of HMA (119).

The backing, tuft and carrier components (103, 107,115) are all made from compatible thermoplastic materials such as polyester so the carpet can be recycled. However the tufts (107) are weakly fixed to the matt (103) due to the poor penetration of the HMA adhesive (111, 119) forming brittle weak bonds.

Figure 3:
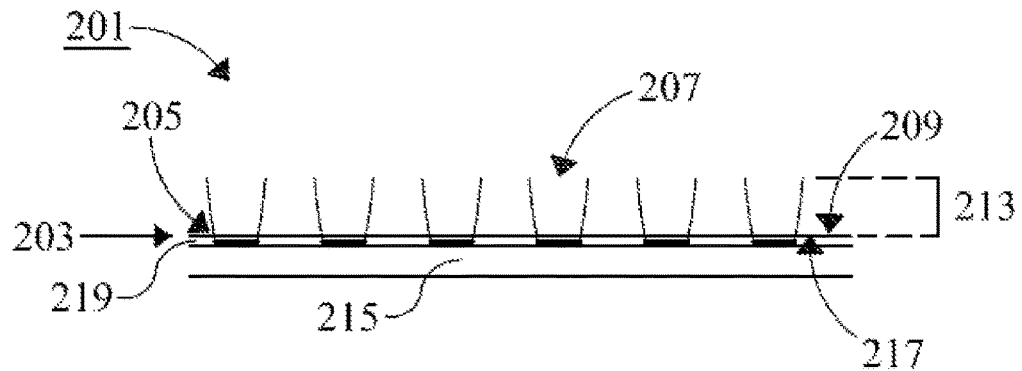
FIG. 3 shows a cross-section of laminated carpet in one embodiment of the present invention.

A recyclable laminated carpet of the present invention is shown in FIG. 3. The carpet (201) has a primary backing (203) made from materials such as polyamide or polyester. The primary backing has holes (205) therein through which tufts (207) are mounted and protrude form a front surface (209). The tufts (207) are made from materials such as PA or PET that are compatible with the primary backing (203). The tufts (207) are attached to the primary backing (203) by the fibre binding process (i.e. melting the yarn as described in WO 2012/076348) to form a tuft matt (213) as the primary mat sheet and without any adhesive. A secondary support carrier (215) made from materials such as PET is glued onto the back side (217) of the tuft matt using a HMA such as a polyester hot glue (219).

In this embodiment the primary backing, tuft and secondary backing components (203, 207,215) are all made from compatible thermoplastic materials such as polyester so the complete carpet (201) can be recycled. The tufts (207) are strongly bound to the matt (203) due to the combined use of the fibre-binding process (melting the yarn to the backing) plus a single layer of HMA (219). It will be appreciated that whilst in this embodiment the materials are compatible as we have an all-polyester carpet, in similar alternative embodiments (not shown in FIG. 2, but of similar construction) may for example comprise incompatible materials such as polyamide tufts (e.g. nylon 6) and a polyamide primary backing (such as nylon 6) with a polyester-based secondary backing (such as PET). The polyester and polyamide parts need not be (and in general will not be) compatible. In that embodiment if the HMA is reversible (e.g. by heating) then the nylon yarn and nylon intermediate product can be detached from the PET support layer so that they nylon and PET parts can be separately recyclable.

FIG. 4 schematically represents a configuration for applying a fibre-binding process in line with the process as described in WO 2012/076348. In the configuration shown in FIG. 4 a first heating block 500 and a second heating block 501 are present, in order to heat the heating elements, also denoted as heating blades, 505 and 506 respectively. These heating elements have a working surface 515 and 516 respectively, which surfaces are brought in contact with a product to be processed, typically a primary carrier to which yarns are applied via a stitching process. The working surfaces both have a working width of 18 mm, and the intermediate distance is 26 mm. The back surface of the product is brought in contact with the working surfaces of the heating elements. In order to be able and apply adequate pressure for the product to be processed, a Teflon support 520 is present which is used to counteract a pushing force applied to the heating elements. In operation, the heating elements are moved relatively to the product in the indicated direction X. Typically, the heating elements are stationary and the product is forced to travel between the working surfaces and the Teflon support in a direction opposite to the direction indicated with X.

In an embodiment a product to be processed with the above described configuration consists of a primary carrier commercially available from Freudenberg (Germany) under the trade mark Lutradur® E6412 which is a 100% polyester backing having a melting temperature of about 280° C., provided with a cut pile of 100% polyester yarns, tufted into the Lutradur® backing. The yarns have a melting temperature of about 285° C. This product is processed using a temperature of the first heating element of 220° C., in order to pre-heat the product. The second heating element is kept at a temperature of 298° C. To keep the temperatures at the required level, the heating blocks and heating elements are provided with layers of insulating material 510, 511, 512 and 513 respectively. The product is supplied at a speed of 12 mm per second (0.72 meter per minute), and the pressure applied with the heating elements is about 1.35 Newton per square centimeter. This results in a product having a calendered back surface, i.e. being smooth at the sites where the stitched yarns extended from the back surface.

FIG. 5 schematically represents a configuration for applying a carrier sheet, in this case a dimensionally stable polyester sheet, to the back of the 100% polyester product that is produced with a method as described in conjunction with FIG. 5. In this figure a first roller 600 is depicted on to which roller is wound a 2 meter wide web of the said (pre-fabricated) polyester product. The product is unwound from the roller 600 to have its back-side 217 to come into contact with a second roller 601. This roller is provided to apply a layer of hot melt adhesive 219 to the back side 217. For this, a bulk amount of HMA 219 is present and heated between the rollers 601 and 602. The thickness of this layer can be adjusted by adjusting the gap between these two rollers. Downstream of the site of HMA application is a second carrier sheet 215, which sheet is unwound from roller 603. This sheet is pressed against the hot and tacky adhesive and cooled in the unit 700. This unit consists of two belts 701 and 702 which on the one hand press the sheet 215 against the primary product, and on the other hand cools down the adhesive to below its solidification temperature. The resulting end product 201 is thereafter wound on roller 604. In an alternative embodiment the fibre-binding process as described in relation with FIG. 4 and the lamination process take place in line. In that case, the fibre-binding set-up as shown in FIG. 4 could be placed between roller 600 and roller 601.

In an embodiment the applied HMA is polyester Example D used to prepare a carpet of Example 5 as described herein. A suitable temperature of the roller 601 at the site where the HMA is applied to the back-side of the primary backing is 140° C. By having a gap of 2 mm, the HMA, at a web speed of 2 m/min, roller 602 not revolving and roller 601 having a circumferential speed of ±1.6 m/min, will be applied with a thickness of about 500 g/m². This is adequate to glue the polyesters sheet 215 to the primary backing.

In yet another embodiment wherein the yarns extend through the primary backing (thus not alone extend at the face side, but also through the back surface, for example as a loop, weave etc.), at least a part of the yarns that extends out of back surface is melted. In this embodiment at least a part of yarns that extend out of the back surface of the primary backing (typically a part of the fibre that runs more or less parallel to the backing surface) is melted. It was found that when the yarns extend out of the back surface they are easier to melt and the calendaring is also an easier process since the melted material in fact lies "on top of" the back surface. Another advantage is that the primary backing material itself may be chosen of a material that has a melting temperature far above that of the yarns, so that the backing itself remains completely unaffected by the melting process if desired. Also, this provides the advantage that a primary backing may be used that is more dimensionally stable at the high process temperature used for fibre-binding.

In another embodiment, wherein the adhesive is provided by applying molten adhesive on the calendared surface of the intermediate (or fibre bonded mat), the calendared surface of the intermediate has a temperature above the melting temperature of the hot melt adhesive when the adhesive is applied. It was found that a product can be obtained having an even improved resistance to mechanical load when the calendared surface of the fibre bonded matt has a temperature above the melting temperature of the hot melt adhesive when the adhesive is applied. It is believed that due to the temperature of the back surface above the melting temperature of the hot melt adhesive, this adhesive can penetrate, for example on a molecular scale, the material of the intermediate (the yarns material and/or material of the primary backing itself) to provide for an even stronger result. In particular when the second intermediate comprises material with a low surface tension (and thus has an inherent tendency to repel material such as the adhesive), this may still provide to have a very durable bonding anyway.

The hot melt adhesive may be optionally provided as a layer having a thickness of less than 1 mm, usefully less than 0.5 mm, more usefully from 0.2 to 0.4 mm. Whereas in the prior art carpets on the market, the hot melt layer typically has a thickness well above 1 mm, applicant found that when reducing the thickness of this layer to 1 mm or below an adequate adhesion can still be obtained. Therefore the adhesive layer present in textile products of the present invention (for example between a primary yarn bearing layer and a carrier substrate) may have preferred mean thickness of from 50 microns to 1 mm, more preferably from 0.1 mm to 0.8 mm, most preferably from 0.2 mm to 0.4 mm.

The amount of HMA used to form the adhesive layer in textile products of the present invention (measured using any suitable conventional methods well known to those skilled in the art) may be from 0.01 to 1000 g/m² of HMA per area of the adhesive layer, In another embodiment the HMA may be applied in an amount of from 0.05 to 800 g/m². In a still yet other embodiment HMA may be applied in an amount from 0.1 to 600 g/m².

In the present invention to achieve substantially complete recyclability of the textile product it is preferred that the first yarn-bearing material (the primary backing) and the yarn attached thereto have comparable melting points. Usefully the yarn bearing material and the yarn are from the same material, for example polyamide, such as polyamide-6, or polyester. However if these materials are different conveniently the yarn-bearing material has a higher melting temperature than the yarn.

As used herein, unless indicated otherwise, comparable melting points denotes that the melting points are within 10° Celsius of each other, more preferably are within 5° Celsius of each other, most preferably are substantially the same.

It is optional (but not necessary to achieve substantial or complete recyclability of the textile product) that any optional carrier material (the secondary backing) is made from the same material type and also has a melting point comparable with (preferably substantially the same as, more preferably the same as) he first yarn-bearing material and the yarn. If the melting points are comparable and if the yarn-bearing material (primary backing), yarn and carrier material (secondary backing) [and optionally even the HMA] are all made from the same type of material these can optionally all be recycled together by the same method and no separation may be needed. They yarn-bearing material, yarn and carrier material may be the same or different. If the carrier material is different from the yarn bearing material and/or yarn it is preferred that the carrier material has a higher melting point than at least one, more preferably both of the yarn bearing material and yarn. One preferred carrier material is polyethylene terephthalate (PET).

However it is not necessary that the carrier material and the yarn bearing material (with yarn) have compatible melting points. For example if the carrier and yarn bearing material are made from different polymer materials they may have different melting points. The carrier and yarn bearing material are readily separable from each other by heating the reversible hot melt adhesive, and thus it is preferred that the HMA has a melting point below that of all other components, as described herein and once separated these materials can be recycled by different methods if necessary.

In one especially preferred embodiment of the invention where the yarn, the yarn bearing material and the carrier (where present) are all polyesters their melting points are each compatible, more preferably the same (as for example will be the case when each are formed from same polymer such as a polyester). It is preferred that in this embodiment that the HMA has a lower melting point than the yarn, the yarn bearing material and the carrier. More preferably in this embodiment the HMA may comprise a similar type of polymer (e.g. polyester) to the yarn, yarn being material and/or carrier.

The hot melt adhesive used in the present invention (which is optionally a polyester) preferably has a softening temperature lower that the lowest melt temperature of the yarn-bearing material, yarn and carrier material (where present).

Preferences for the materials that may comprise the components of the textile products of the invention such as the yarn, first (primary backing) sheet, adhesive and/or secondary backing are given later in the description. For example suitable hot melt adhesives for use in the present invention may be HMAs that comprising a polymer denoted as Polymer P as further defined later. Similarly polymers suitable for the yarn, first (yarn bearing) sheet and/or second (carrier) sheet (where present) may each independently comprise one or more polymer(s) from those denoted as Polymer R as further defined later. In one embodiment of the invention Polymer P the main constituent of the HMA may be essentially the same as those polymers used for Polymer R, although it is preferred that the HMA melts at a lower temperature than the other components of the textile product (if polymer P and polymer(s) R are the same the lowering melting of the HMA may be achieved because the HMA comprises other ingredients which may act to lower the melting temperature, (i.e. HMA is not necessarily pure Polymer P).

In a further embodiment of the textile product of the invention, the primary backing, the secondary backing or carrier sheet and the hot melt adhesive are in essence of the same type of polymer, for example polyester. This greatly improves the ability to easily recycle the textile product when worn (also referred to as a worn textile product). The whole worn product can simply be melted in one step to produce a melt of a conventional polymer of one type. Such a molten material is far more easy to use in a new application than molten material that comprises a mixture of two types of polymer such as for example polyamide and polyester. It is preferred that in this embodiment that the HMA has a lower melting point than the yarn, the yarn bearing material and the carrier.

In another embodiment of the recycling method of the invention, the textile product to be recycled is heated together as a whole, thereby melting the polymers comprising the yarns, the backing, the support sheet (if present) and the hot melt adhesive to obtain a molten polymer of one type which can be re-used.

Yarn

Suitable materials that may be used to comprise the yarn fibres (also known as tufts) in the present invention can be selected from yarn materials are well known to those skilled in the art and for example include: natural fibres (e.g. wool, cotton and/or jute), synthetic fibres (e.g. polypropylene, polyamide, (for example aliphatic polyamides such as nylons e.g. nylon 6 or nylon 6-6), polyester and/or acrylic) and/or blends of natural and synthetic fibres (e.g. wool blends such as an 80 to 20 blend of wool to synthetic fibre).

However preferred yarn materials are those that can be melted (or at least a component of which can be melted) in the process of the present invention and thus are selected from synthetic fibres comprising (more usefully consisting of): polyolefin (such as polypropylene), polyamide, (for example aliphatic polyamides such as nylons e.g. nylon 6 or nylon 6-6), polyester, acrylates, copolymers thereof and/or mixtures thereof;

More preferred yarn material(s) comprise: polyesters and/or polyamides.

Most preferred yarn material(s) comprise; polyester and/or aliphatic polyamides (such as nylons)

Example of suitable yarn material(s) comprise nylon-6 and/or nylon 6-6.

Other suitable polymers that the yarn may comprise of, optionally consist of, are referred to herein Polymer R.

Intermediate Product

Suitable materials that may be used to form the first yarn-bearing material (also known as primary backing) in the present invention can be selected from any of those specified for use as the yarn above (as well as those any of those polymers referred to herein as Polymer R).

It will be appreciated that the intermediate product may comprise a mixture of a plurality of materials or may consist of one material. In one embodiment of the invention the intermediate product comprises (either as the whole or a part thereof) the same material as the yarn and also optionally where present as the carrier sheet (or a component thereof if a mixture).

Preferred intermediate product material(s) comprise: polyesters and/or polyamides.

More preferred intermediate product material(s) comprise: polyester and/or aliphatic polyamides (such as nylons)

Most preferred intermediate product material comprise (s); nylon-6 and/or nylon 6-6.

Additional or alternative suitable materials that may comprise the primary backing (or intermediate product) will be well known to those skilled in the art and may for example be selected from: polyolefins.

Carrier Sheet

Suitable materials that may be used to form the carrier sheet in the present invention can be selected from any of those specified for use as the yarn and or yarn bearing material above (and also independently any of those polymers referred to herein as Polymer R).

Suitable materials that may be used to form the carrier sheet (also known as support sheet or carrier sheet) in the present invention can be selected from any of those specified for use as the yarn or intermediate product above. It will be appreciated that the carrier sheet may comprise a mixture of a plurality of materials or may consist of one material. In one embodiment of the invention the carrier sheet comprises (either as the whole or a part thereof) the same material as the yarn and also optionally as the intermediate product (or a component thereof if a mixture).

Preferred carrier sheet material(s) comprise: polyesters and/or polyamides.

More preferred carrier sheet material(s) comprise: polyester and/or aliphatic polyamides (such as nylons). Most preferred carrier sheet material comprises; nylon-6 and/or nylon 6-6. Additional or alternative suitable materials that may comprise the carrier sheet in whole or in part will be well known to those skilled in the art and may for example be selected from: optionally functional polyolefins, polyethylene terephthalate (PET), poly vinyl chloride (PVC) and/or bitumen.

It is also a preference that, where present, the carrier sheet has good dimensional stability to also impart additional dimensional stability to the final textile product of which it forms a part. Therefore conveniently, suitable materials for the carrier sheet may comprise polymers such as polyethylene terephthalate (PET) as this has good dimensional stability even in water, especially where the intermediate product comprises materials that can exhibit reduced dimensional stability when exposed to water (such as some nylons).

As it is also desired that the textile products of the present invention are recyclable to some extent in whole or in part other suitable materials for use to comprise the first or carrier sheets are those that have a low overall environmental impact (e.g. as measured by a life cycle assessment (or LCA)) such as bitumen which is a naturally occurring material consisting of deposits of a solid or semi-solid form of petroleum.

Hot Melt Adhesive (HMA)

As used herein the term 'adhesive' or 'adhesive composition' denotes any composition that remains substantially tacky after drying under ambient conditions (i.e. which is not tack-free) for a length of time which would be commercially acceptable and practical for the intended use herein. Typical adhesive compositions may remain tacky for at least 16 hours after they have been applied to a surface. Tackiness time may conveniently be measured as described herein.

Hot melt adhesives (abbreviated to HMA herein) are well known to those skilled in the art. Preferred hot melt adhesives (HMAs), also known as hot glues are thermoplastic adhesives that have a low amount or preferably are substantially free of solvent and are applied to a hot substrate as a fluid (e.g. by dipping or spraying), so the adhesive has a suitably low viscosity, is tacky when hot and then solidifies rapidly after application (typically in a few seconds to one minute), with little or no drying needed. Usefully the solid adhesive film may still remain tacky for some time after application to allow (re)positioning of the substrate to which it has been applied though unlike pressure sensitive adhesives (PSA) typical HMA are not permanently tacky as the solid film, As HMA comprise little or no solvent, unlike solvent based adhesives, the HMA film layer does not shrink or lose thickness as it solidifies. Other optional advantages of HMA are: good open time (time taken for permanent bond to occur) providing enough time to reposition the components of the textile product as needed;

HMA as used herein can be used alone or combined or mixed with other adhesive types (such as reactive adhesives) for example in the same adhesive composition (denoted as a "HMA/adhesive mixture"). However in a much preferred embodiment HMA is used on its own and is not mixed with other adhesive types in the same composition. Nevertheless mixing HMA with other adhesive types can have some advantages. HMA/adhesive mixtures can reduce thermal load on the substrate allowing use of substrates sensitive to higher temperatures. Using HMA/adhesive mixtures can also counter act the tendency of HMA to lose bond strength at higher temperatures allowing their use up to the melt temperature of the adhesive. Such HMA/adhesive mixtures may also have improved chemical and weather resistance. However if HMA/adhesive mixtures are used as the hot melt component described herein, it is preferred that the other (non-HMA) adhesive types form no more than 50%, more preferably less than 40%, even more preferably less than 30%, most preferably less than 20%, for example less than 10% by weight of the total weight of the HMA/adhesive mixture.

It is preferred that the HMA is applied at a temperature above its melt temperature but below the melt temperature of the surface to which it is applied. Thus is it preferred that the HMA has a lower melt temperature that the intermediate product and the carrier sheet. Some materials may retain heat more readily that others and therefore a skilled person would understand that depends on the material(s) that comprise the intermediate product and the carrier sheet whether or not either would need pre-heating and/or heating during HMA application to maintain the HMA melt with sufficiently low viscosity for the HMA to be readily applied to the textile product, It is preferred that if one or both the intermediate product and/or the carrier sheets comprise a polyamide such as nylon, then this material is heated to a suitable temperature (for example close to or above the melt temperature of the HMA) when applying the hot melt adhesive, Useful hot melt adhesives suitable for used in the present invention may comprise a polymer P optionally present as a main constituent (i.e. in an amount of at least 50% by weight of the adhesive composition). Conveniently the hot melt adhesive comprises at least 60%, more conveniently at least 70%, most conveniently at least 80% of polymer P by weight of the adhesive composition.

Unless the context clearly indicates otherwise the polymers listed herein for Polymer P of the HMA may also be selected as suitable for any of the Polymer(s) R that may independently comprise the other components of the textile product (such as the yarn, intermediate product and carrier sheet). Therefore it will be appreciated that additional preferences for some Polymer(s) R are not necessarily additionally repeated herein to those preferences given herein for Polymer P.

Usefully the Polymer P, Polymer R and/or the hot-melt adhesive may be substantially bio-based as defined herein.

For textile products which are predominately polyester, for example where the yarn, intermediate product and carrier sheet comprise polyester then the hot melt adhesive may optionally also comprise a small amount of cross-linking agent (preferably no more than 10% by weight of HMA, more preferably less than 5%, most preferably <3%), usefully to cross-link with the ester components as during recycling these cross-links will be easily broken. For textile products that comprise a polyamide mat (i.e. yarns and primary backing of polyamide) and a carrier sheet of polyester, it is not desired that the HMA will contain cross-linking agent as then complete separation of the components of the textile product would be much more difficult. In such an embodiment (polyamide primary mat and polyester secondary backing) it is preferred that the HMA is substantially free of (preferably free of) any cross-linker.

Polymer P (and/or Polymer(s) R) may comprise a crystalline polymer or be amorphous. Conveniently Polymer P is semi crystalline. Polymer P (and/or Polymer(s) R) may have a melting point from 40 to 300° C. where the polymer is other than polyamide and where Polymer P (and/or Polymer(s) R) comprises polyamide a melting point from 40 to 215° C. Usefully Polymer P (and/or Polymer(s) R) has a melting point from 40 to 200° C., more usefully from 60 to 160° C. most usefully from 60 to 150° C., for example about 70° C.

By "crystalline" is meant herein that material (such as a polymer, resin, resin composition and/or polymer composition used in or of the invention) has a melting enthalpy ($\Delta Hm$) of at least 5 J/g, preferably at least 8 J/g, more preferably of at least 10 J/g, most preferably at least 15 J/g. A person skilled in the art would appreciate that many crystalline materials are not fully crystalline but have a degree of crystallinity which is less than 100%, preferably from 2 to 98%, more preferably from 5 to 90%, most preferably from 10 to 80%. Such materials comprise a mixture of phases such as domains of amorphous material and domains of crystalline material (e.g. where polymer chains are substantially aligned) and are often referred to by the informal term "semi-crystalline". The different domains can be seen for example under a polarised light microscope and/or by transmission electron microscopy (TEM). The degree of crystallinity of a 'semi-crystalline' material may be measured by any suitable method such as by measuring density, by differential scanning calorimetry (DSC), by X-ray diffraction (XRD), by infrared spectroscopy and/or by nuclear magnetic resonance (NMR).

Polymer P (and/or Polymer(s) R) may have a glass transition temperature below 50° C., advantageously below 40° C.

Polymer P (and/or Polymer(s) R) may have a melt viscosity (all measured at 150° C. in the method described herein) of less than 500 Pa·s, usefully less than 300 Pa·s, more usefully less than 200 Pa·s, most usefully less than 100 Pa·s.

In one embodiment of the invention the polymer P (and/or Polymer(s) R) may have a melting point from 40 to 200° C., a glass transition temperature below 50° C. and a melt viscosity at 150° C. of less than 500 Pa·s.

In another embodiment of the invention the Polymer P (and/or Polymer(s) R) may have a melting point from 60 to 100° C., a glass transition temperature below 50° C. and a melt viscosity at 150° C. of less than 300 Pa·s.

In yet another embodiment of the invention the Polymer P (and/or Polymer(s) R) may have a melting point from 60 to 120° C., a glass transition temperature below 40° C. and a melt viscosity at 150° C. of less than 200 Pa·s.

In any of the preceding three embodiments the Polymer P (and/or Polymer(s) R) is most preferably a (co)polyester.

Polymer P (and/or Polymer(s) R) may be obtained and/or obtainable by a polycondensation, a ring opening polymerisation of cyclic monomers and/or a step-growth polymerisation method.

Although Polymer P (and/or Polymer(s) R) can also comprise (co)polyurethane and/or a(co)polycarbonate type polymer(s) preferably Polymer P (and/or Polymer(s) R) comprise (co)polyester(s), (co)polyamide(s) and/or poly(ester-amide)(s), More preferred Polymer P and/or Polymer(s) R are obtained by a polycondensation and/or by a ring opening polymerisation of cyclic monomers (e.g. cyclic ester and/or cyclic amide). Even more preferred Polymer P and/or Polymer(s) R comprise (co)polyester(s), most preferably are polyester(s).

Preferably the weight average molecular weight (Mw) of the Polymer P and/or Polymer(s) R is <500000 g/mol, more preferably <250000 g/mol and most preferably <100000 g/mol. Preferably the weight average molecular weight (Mw) of the Polymer P and/or polymer(s) R is >1000 g/mol more preferably >3500 g/mol and most preferably >5000 g/mol. Preferably the weight average molecular weight (Mw) of the Polymer P and/or polymer(s) R is from 100 to 500000 g/mol, more preferably from 3500 to 250000 g/mol and most preferably from 5000 to 100000 g/mol.

Preferably the number average molecular weight (Mn) of the Polymer P and/or Polymer(s) R is <300000 g/mol, more preferably <100000 g/mol and most preferably <50,000 g/mol. Preferably the number average molecular weight (Mn) of the Polymer P and/or polymer(s) R is >500 g/mol more preferably >1000 g/mol and most preferably >2000 g/mol. Preferably the number average molecular weight (Mn) of the Polymer P and/or polymer(s) R is from 500 to 300000 g/mol, more preferably from 100 to 100000 g/mol and most preferably from 2000 to 50000 g/mol.

Usefully the weight average molecular weight (Mw) of the Polymer P and/or polymer(s) R (especially where they comprise polyester) is >3500 g/mol, more usefully >5000 g/mol, most usefully >8000 g/mol and especially >10000 g/mol. Usefully the weight average molecular weight (Mw) of the Polymer P and/or polymer(s) R (especially where they comprise polyester) is <75000 g/mol, more usefully <60000 g/mol, most usefully <50,000 g/mol and especially <40000 g/mol. Usefully the weight average molecular weight (Mw) of the Polymer P and/or polymer(s) R (especially where they comprise polyester) is from 3500 to 75000 g/mol, more usefully from 5000 to 60000 g/mol, most usefully from 8000 to 50000 g/mol and especially from 10000 to 40000 g/mol.

Usefully the number average molecular weight (Mn) of the Polymer P and/or polymer(s) R (especially where they comprise polyester) is >1500 g/mol, more usefully >2000 g/mol, most usefully >3000 g/mol and especially >5000 g/mol. Usefully the number average molecular weight (Mn) of the Polymer P and/or polymer(s) R (especially where they comprise polyester) is <60000 g/mol, more usefully <50000 g/mol, most usefully <40000 g/mol and especially <30000 g/mol. Usefully the number average molecular weight (Mn) of the Polymer P and/or polymer(s) R (especially where they comprise polyester) is from 1500 to 60000 g/mol, more usefully from 2000 to 50000 g/mol, most usefully from 3000 to 40000 g/mol and especially from 5000 to 30000 g/mol.

The molecular weight distribution (MWD) of the polymer may influence properties such as the equilibrium viscosity of the compositions comprising them. MWD is conventionally described by the polydispersity index (PDi). PDi is defined as the weight average molecular weight divided by the number average molecular weight (Mw/Mn) where lower values are equivalent to lower PDi's. Preferably the value of PDi is <30, more preferably <15, most preferably <10 and especially <5.

A generic (co)polyester-amide may be formed by the condensation reaction of for example molecules having acid or anhydride functionalities with molecules having alcohol and/or amine functionalities. Thus for example polycondensation of suitable polyfunctional acids (preferably diacids) with suitable polyols (preferably diols or (mixtures with) tri- or tetrafunctional alcohols) or polycondensation of hydroxy acids can produce polyesters, Also ring opening polymerization of cyclic esters, such as caprolactone, pentadecalactone, ambrettolide and similar materials can produce polyesters. Similarly, polycondensation of suitable poly functional acids (preferably diacids) with suitable polyamines (preferably diamines or mixtures with trifunctional amines) or polycondensation of amino acids can produce polyamides. Ring opening polymerisation of cyclic amides, such as caprolactam, laurolactam and similar materials can produce polyamides. Analogously polycondensation of suitable poly functional acids (preferably diacids) with suitable polyamino alcohols (preferably dialkanol amine), polyols (preferably diols) and/or polyamines (preferably diamines) can produce poly(ester amides). Polyester amides can also be produced by (co)polymerization of lactones and/or lactames (as described herein).

By having more than one of such functional groups on one molecule, polymers may be formed. If an amine such as dialkanol amine is used the resulting polyester resin is generally named as "polyester amide". By having even more functional groups on one molecule it is possible to form hyperbranched polyesters as are well known in the art. By including polyisocyanate components urethanised polyesters (also known as polyester urethanes) may be formed.

Preferred amines and derivatives thereof that may be used to obtain a Polymer P and/or Polymer(s) R comprise any alkyl-, alkanol-, alkoxyalkyl-, di- and polyamines, as well as amino acids, lactams and similar materials; ethylene diamine, butylene diamine, hexamethylene diamine, isophorone diamine, 2-Methylpentamethylenediamine, 1,3-pentanediamine, dimer fatty diamine (e.g. available from Croda under the trade mark Priamine®), ethanolamine, diethanol amine, isopropanol amine, diisopropanol amine, caprolactam, laurolactam, lysine, glycine and/or glutamine.

Thus, it is well known that polyesters, which contain carbonyloxy (i.e. —C(=O)—O—) linking groups may be prepared by a condensation polymerisation process in which monomers providing an "acid component" (including ester-forming derivatives thereof) is reacted with monomers providing a "hydroxyl component".

The monomers providing an acid component may be selected from one or more polybasic carboxylic acids such as di- or tri-carboxylic acids or ester-forming derivatives thereof such as acid halides, anhydrides or esters. The monomers providing a hydroxyl component may be one or more polyhydric alcohols or phenols (polyols) such as diols, triols, etc. It is to be understood, that the polyester resins described herein may optionally comprise autoxidisable units in the main chain or in side chains' and such polyesters are known as autoxidisable polyesters.

If desired the polyesters may also comprises a proportion of carbonylamino linking groups —C(=O)—NH— (i.e. amide linking group) or —C(=O)—N—$R^2$—(tertiary amide linking group) by including an appropriate amino functional reactant as part of the hydroxyl component or alternatively all of the hydroxyl component may comprise amino functional reactants, thus resulting in a polyester amide resin. Such amide linkages are in fact useful in that they are more hydrolysis resistant.

There are many examples of carboxylic acids (or their ester forming derivatives such as anhydrides, acid chlorides, or lower (i.e. $C_{1-6}$alkyl esters) which can be used in polyester synthesis for the provision of the monomers providing an acid component. Examples include, but are not limited to monofunctional acids such as (alkylated) benzoic acid and hexanoic acid; and $C_{4-20}$ aliphatic, alicyclic and aromatic dicarboxylic acids (or higher functionality acids) or their ester-forming derivatives.

Preferred examples of suitable acids and derivatives thereof that may be used to obtain a polyester such as Polymer P and/or Polymer(s) R comprise any of the following: adipic acid, fumaric acid, maleic acid, citric acid, succinic acid, itaconic acid, azelaic acid, sebacic acid, suberic acid, pimelic acid nonanedioic acid, decanedioic acid, 1,4-cyclohexanedicarboxylic acid, 1,3-cyclohexanedicarboxylic acid, 1,2-cyclohexanedicarboxylic acid, terephthalic acid, isophthalic acid, sulfoisophthallic acids and/or metal salts thereof (e.g. 5-sodiosulpho isophthalic acid), phthalic acid, tetrahydrophthalic acid, 2,5-furanedicarboxylic acid (FDCA), any suitable mixtures thereof, combinations thereof and/or any suitable derivatives thereof (such as esters, e.g. di($C_{1-4}$ alkyl) esters, metal salts and/or anhydrides). Suitable anhydrides include succinic, maleic, phthalic, trimellitic and hexahydrophthalic anhydrides.

More preferred (co)polyesters may be obtained from the following acids: terephthalic acid, isophthalic acid, succinic acid, suberic acid, pimelic acid, adipic acid, fumaric acid, maleic acid, itaconic acid, dimer fatty acid, sebacic acid, azelaic acid, sulfoisophthallic acid (and/or its metal salt), 1,3-cyclohexanedicarboxylic acid, 1,4-cyclohexane dicarboxylic acid, 2,5-furane dicarboxylic acid, trimellitic anhydride, esters thereof (e.g. dialkyl esters thereof), combinations thereof and/or mixtures thereof.

Similarly there are many examples of polyols which may be used in (optionally autoxidisable) polyester resin synthesis for the provision of the monomers providing a hydroxyl component. The polyols preferably have from 1 to 6 (more preferably 2 to 4) hydroxyl groups per molecule. Suitable monofunctional alcohols include for example eicosanol and lauryl alcohol. Suitable polyols with two hydroxy groups per molecule include diols such as 1,2-ethanediol, 1,3-propanediol, 1,4-butanediol, 2,3-butanediol, 1,6-hexanediol, 2,2-dimethyl-1,3-propanediol (neopentyl glycol), the 1,2-, 1,3- and 1,4-cyclohexanediols and the corresponding cyclohexane dimethanols, diethylene glycol, dipropylene glycol, and diols such as alkoxylated bisphenol A products, e.g. ethoxylated or propoxylated bisphenol A. Suitable polyols with three hydroxy groups per molecule include triols such as trimethylol propane (TMP) and 1,1,1-tris (hydroxymethyl)ethane (TME). Suitable polyols with four or more hydroxy groups per molecule include bis-TMP, pentaerythritol (2,2-bis(hydroxymethyl)-1,3-propanediol), bis-pentaerythritol and sorbitol (1,2,3,4,5,6-hexahydroxyhexane). Examples of hydroxyl functional amines with both hydroxyl functionality and amine functionality are described in, for example, WO 00/32708, use of diisopropanol amine is preferred. These can be used to prepare polyester amide resins.

Elastomeric polyols may also be used as building blocks to prepare the Polymer P and/or Polymer(s) R (e.g. a polyester) and suitable polyols may comprise dihydroxy-terminated polytetrahydrofuran (polyTHF), dihydroxy-terminated polypropylene glycol, dihydroxy-terminated polybutylene succinate, dihydroxy-terminated polybutylene adipate; other aliphatic polyesters with Tg below zero and two OH end groups; and/or any mixtures thereof and/or any combinations thereof. Examples of suitable copolyester elastomers that may be obtainable and/or obtained from such polyols are those available from DSM under the trade mark Arnitel®.

Preferred examples of suitable alcohols that may be used to obtain a polyester Polymer P and/or R comprise any of the following; isosorbide, ethylene glycol, 1,2-propanediol, 1,3-propandiol, 1,5-pentanediol, neopentyl glycol, diethylene glycol, triethylene glycol, 1,8-octanediol, 2,2,4-trimethyl-1, 3pentanediol, polyethylene glycol, polypropylene glycol, 2,2,4,4-tetramethyl-1,3-cyclobutanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 2,3-butanediol (e.g. from a renewable source) 1,5-pentanediol, 1,6-hexandediol, 1,4-butanediol, dimer fatty acid diol, glycerol, pentaerythritol, di-pentaerythritol, any suitable combinations and/or mixtures thereof.

In yet another embodiment the (co) polyester may be built up from an acid selected from terephthalic acid, isophthalic acid, succinic acid, suberic acid, pimelic acid, adipic acid, fumaric acid, maleic acid, itaconic acid, dimer fatty acid, sebacic acid, azelaic acid, sulfoisophthallic acid or its metal salt, 1,3-cyclohexanedicarboxylic acid, 1,4-cyclohexane dicarboxylic acid, furane dicarboxylic acid, trimellitic anhydride and/or dialkyl esters thereof, mixtures thereof together with an alcohol selected from: ethylene glycol, 1,2-propanediol, 1,3-propandiol, 1,5-pentanediol, neopentyl glycol, diethylene glycol, triethylene glycol, 1,8-octanediol, 2,2,4-trimethyl-1,3-pentanediol, polyethylene glycol, polypropylene glycol, 2,2,4,4-tetramethyl-1,3-cyclobutanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-Butanediol, 2,3-butanediol, 1,5-pentanediol, 1,6-Hexandediol, 1,4-butanediol, dimer fatty acid diol, glycerol, pentaerythritol, di-pentaerythritol and/or mixtures thereof.

Dimer fatty acids, dimer fatty diols and/or dimer fatty diamines (e.g. available from Croda) may also be used as potential building blocks to obtain Polymer P and/or R, The esterification polymerisation processes for making the polyester for use in the invention composition are well known in the art and need not be described here in detail. Suffice to say that they are normally carried out in the melt optionally using catalysts such as titanium- or tin-based catalysts and with the provision for removing any water (or alcohol) formed from the condensation reaction.

Preferably if the polyester resin comprises carboxylic acid functionalities, they are derived from a polyacid and or anhydride.

The (co)polyester and other resins described herein as suitable for Polymer P and/or R (whether forming the HMA in whole or in part and/or the intermediate product and/or carrier sheets herein) may also comprise acidic moiet(ies) other than carboxylic acid moieties for example where the resin is prepared from a strong acid such as sulfonated acids, phosphonated acids, derivatives thereof (e.g. esters) and/or salts thereof (e.g. alkali metal salts). Preferred non-carboxylic acid moiet(ies) comprises neutralized or partially neutralized strong acid group selected from sulfonated moieties, phosphonated moieties and/or derivatives thereof, more preferably is an aromatic sulfonated acid or salt thereof, most preferably is an alkali metal sulfo salt of a benzene dicarboxylic acid, for example is represented by formula:

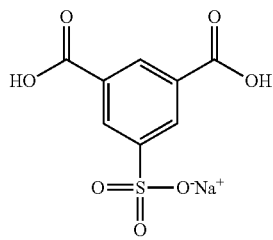

Sodium salt of 5-(sulfo)isophthalic acid (SSIPA)

These strong acids (such as SSIPA) may be used in small amounts (preferably up to 10% by weight of polyester) to prepare the polyester. Without wishing to be bound by any theory it is believed that the presence of ionic groups such as sulfo groups (and derivatives thereof) on the polyester may provide additional advantages to the textile product for example by reducing the tendency to form static electric charge on textile products formed from such polyesters.

It is also possible to react a polyester or polyester amide that is still hydroxyl functional with isocyanates (for example 1 to 20 wt % of isocyanates, more preferably 1 to 12 wt % and especially 1 to 7 wt % on solids) to give a urethanised polyester or urethanised polyester amide (both together are herein also described as a urethanised polyester (-amide) i.e. the amide group presence is optional). The use of diisocyanates, to for example increase the molecular weight is preferred.

Suitable polyisocyanates include aliphatic, cycloaliphatic, araliphatic, aromatic and/or polyisocyanates modified by the introduction of urethane, allophanate, urea, biuret, carbodiimide, uretonimine, urethdione and/or isocyanurate residues. Examples of suitable polyisocyanates include ethylene diisocyanate, 1,6-hexamethylene diisocyanate, isophorone diisocyanate, cyclohexane-1, 4-diisocyanate, 4,4'-dicyclohexylmethane diisocyanate, p-xylene diisocyanate,α,α'-tetramethylxylene diisocyanate, 1,4-phenylene diisocyanate, 2,4-toluene diisocyanate, 2,6-toluene diisocyanate, 4,4'-diphenylmethane diisocyanate, polymethylene polyphenyl polyisocyanates, 2,4'-diphenylmethane diisocyanate, 3(4)-isocyanatomethyl-1-methyl cyclohexyl isocyanate, 1,5-naphthylene diisocyanate, ethyl ester of lysine diisocyanate and mixtures thereof.

Preferred polyisocyanates are isophorone diisocyanate, 4,4'-dicyclohexylmethane diisocyanate, toluene diisocyanate and 4,4'-diphenylmethane diisocyanate.

Preferably, a hydroxyl- or carboxyl-terminated autoxidisable urethanised polyester may be prepared directly by reacting the reactants in proportions corresponding to a ratio of isocyanate groups to isocyanate-reactive groups of at least 0.05:1, more preferably at least 0.1:1 and preferably a ratio of isocyanate groups to isocyanate-reactive groups of less than 1.0:1, more preferably less than 0.85:1, most preferably less than 0.75:1 and especially less than 0.5:1.

Alternatively, an isocyanate-reactive polyester is first reacted with a polyisocyanate, followed by acid functionalisation to provide additional stabilising groups.

If desired, catalysts such as dibutyl tin dilaurate and stannous octoate, zirconium or titanium based catalysts may be used to assist the urethanisation reaction.

Preferably the weight average molecular weight (Mw) of the polyester amide resin or urethanised polyester(-amide) resin is <20,000 g/mol, more preferably <12,000 g/mol and most preferably <9,000 g/mol.

Preferably the polyester amide resin or autoxidisable urethanised polyester(-amide) resin has a PDI less than 8, more preferably a PDI less than 5.5, most preferably a PDI less than 4.0.

Preferably the polyester amide resin or urethanised polyester(-amide) resin has a carbonyl amine content (defined as the presence of NH—C═O or N—C═O in mmoles/100 g solid resin) of at least 10 mmoles/100 g solid resin, more preferably at least 20 mmoles/100 g, most preferably at least 50 mmoles/100 g solid resin and especially at least 65 mmoles/100 g solid resin.

In addition the polyester amide resin or urethanised polyester(-amide) resin preferably has a carbonyl amine content (defined as the presence of NH—C═O or N—C═O in mmoles/100 g solid resin) of less than 500 mmoles/100 g solid resin, more preferably less than 400 mmoles/100 g solid resin, most preferably less than 300 mmoles/100 g solid resin and especially less than 225 mmoles/100 g solid resin.

In one embodiment of the invention conveniently Polymer P and/or Polymer(s) R comprises a (co)polyester, characterised in that the (co)polyester is obtained and/or obtainable from reacting at least one acid selected from terephthalic acid, 2,5-furanedicarboxylic acid, adipic acid, fumaric acid, dimer fatty acid, sebacic acid, azelaic acid, succinic acid, and/or combinations thereof with at least one alcohol selected from ethylene glycol, 1,6-hexandediol, 1,4-butanediol, dimer fatty acid diol and/or combinations thereof.

Usefully the hot melt adhesive used in the present invention comprises (in addition to the Polymer P) up to 50% by weight of optional ingredients selected from, tackifiers, waxes, plasticizers, nucleating agents, anti-static agents, neutralising agents, adhesion promoters, pigments, dyes, emulsifiers, surfactants, thickeners, heat stabilisers, levelling agents, anti-cratering agents, fillers, sedimentation inhibitors, UV absorbers, antioxidants, dispersants, defoamers, co-solvents, wetting agents, reactive diluents and the like and/or combinations thereof introduced at any stage of the production process or subsequently.

Preferably if present any reactive diluents have an Mn >1000 g/mol, more preferably >1500 g/mol and most preferably >2000 g/mol and preferably an Mn <5000 g/mol, more preferably <4000 g/mol and especially <3500 g/mol. It is also possible to include fire retardants like antimony oxide in the adhesive to enhance the fire retardant properties of the adhesive.

Some non-limiting examples of tackifiers include tall oil, gum or wood rosin either unmodified, partially hydrogenated, fully hydrogenated or disproportionated, polymerized rosins, rosin derivatives such as rosin esters, phenolic modified rosin esters, acid modified rosin esters, distilled rosin, dimerised rosin, maleated rosin, and polymerized rosin; hydrocarbon resins including aliphatic and aromatic resins, coumarone-indene resins, polyterpenes, terpene-phenolic resins, maleic resins, ketone resins, reactive resins, hybrid resins and polyester resins.

Plasticisers can be used to reduce the glass transition temperature (Tg) of the polymer. Some non-limiting examples of a plasticizer include benzoate esters, phthalate esters, citrate esters, phosphate esters, terephthalate esters, isophthalate esters, or combinations thereof. As is well known to a skilled person other suitable commercially available plasticisers can also be used to prepare hot melt adhesives for use in the present invention.

The adhesive composition also can comprise one or more compatible waxes to improve the bond strength, prevent or reduce cold flow, and to decrease set time. Some non-limiting examples are 12-hydroxystearamide, N-(2-hydroxy ethyl)-12-hydroxystearamide, stearamide, glycerine monostearate, sorbitan monostearate, 12-hydroxy stearic acid, N,N'-ethylene-bis-stearamide, hydrogenated castor oil, oxidized synthetic waxes, and functionalized synthetic waxes such as oxidized polyethylene waxes.

Nucleating agents may be used with the adhesive composition to modify and control crystal formation. The terms "nucleating agent" and "nucleator" are synonymous and refer to a chemical substance which when incorporated into polymers form nuclei for the growth of crystals in the polymer melt. Any incompatible material can serve as a nucleator provided that it rapidly separates into particles as the molten adhesive cools. There are a wide variety of organic and inorganic materials known as nucleating agents that skilled person would be able to select as suitable for use in the present invention. Low molecular weight polyolefins and/or olefinic ionomers with a melt temperature from 70° C. to 130° C. or talcum are non-limiting examples of suitable nucleating agents that could be used in the present invention.

In yet another embodiment the performance of the adhesive is increased by the use of up to 50 weight percent of tackifier, wax, plasticizer, nucleating agent, anti-static agent or combinations thereof. Some non-limiting examples of tackifiers include tall oil, gum or wood rosin either unmodified, partially hydrogenated, fully hydrogenated or disproportionated, polymerized rosins, rosin derivatives such as rosin esters, phenolic modified rosin esters, acid modified rosin esters, distilled rosin, dimerised rosin, maleated rosin, and polymerized rosin; hydrocarbon resins including aliphatic and aromatic resins, coumarone-indene resins, polyterpenes, terpene-phenolic resins, maleic resins, ketone resins, reactive resins, hybrid resins and polyester resins.

Plasticizers can be used to reduce the Tg. Some non-limiting examples of a plasticizer include benzoate esters, phthalate esters, citrate esters, phosphate esters, terephthalate esters, isophthalate esters, or combinations thereof. Other commercially available plasticisers may also be used as is well known to those skilled in the art.

The adhesive composition also can comprise one or more compatible waxes to improve the bond strength, prevent or reduce cold flow, and to decrease set time. Some non-limiting examples are 12-hydroxystearamide, N-(2-hydroxy ethyl)-12-hydroxystearamide, stearamide, glycerine monostearate, sorbitan monostearate, 12-hydroxy stearic acid, N,N'-ethylene-bis-stearamide, hydrogenated castor oil, oxidized synthetic waxes, and functionalized synthetic waxes such as oxidized polyethylene waxes.

Preferred hot melt adhesives that are suitable for use in the present invention exhibit one or more (more preferably all) of the following properties:

They can be applied (in a molten state) at a temperature from 60 to 150° C., preferably from 75 to 130° C.;

viscosity of less than 500 Pa·s, preferably <200 Pa·s at 150° C.;

melt temperature (also denoted $T_m$) of from 60 to 130° C.; and/or crystallisation temperature (also denoted $T_c$) of from 60 to 130° C.;

$T_m$ and $T_c$ may be obtained by any suitable method such as Differential Scanning calorimetry (DSC). If melting and/or crystallisation of a sample is observed over a temperature range, the $T_m$ and/or $T_c$ values are recorded as the peak (maximum) temperature observed in this range.

Optional Properties of Textile Product

Optionally textile products of the invention, such as carpets of the present invention may exhibit one or more, more optionally two or more, even more optionally three or more, most optionally four or more, for example five or more, e.g. all, of the following properties the test methods.

(i) Water resistance (as measured in the hydrostatic pressure test described in the American Association of Textile Chemists and Colorists (AATCC) Test Method 127-2008)) of <10,000 g water/m$^2$/day (ii) Adhesion of the fibres to the textile product of at least 20 N, preferably >25 N, more preferably >30 N measured as the average force—required to remove the fibres in a method analogous to the "Tuft bind" method described in paragraph [0071] of US2010-0098901 (Dow Chemical) and in ASTM D1335 and converted to N from pounds force (lbf))

(iii) Dry lamination strength of the intermediate product and of the carrier sheet of at least 0.2 N/mm, preferably >0.3 N/mm, more preferably >0.5 N/mm as a measure of the strength of the bond between the intermediate product and the carrier sheet measured in a method analogous to the Dry Lamination Strength' method described in paragraph [0072] of US2010-0098901 and in ASTM D3936 converted from pounds per inch (lb/in) to N/mm)

(iv) Wet lamination strength of the intermediate product and of the carrier sheet of at least 0.05 N/mm, preferably >0.10 N/mm, more preferably >0.15 N/mm—as a measure of the strength of the bond between the intermediate product and the carrier sheet measured in a method analogous to the 'Wet Lamination Strength' method described in paragraph [0073] of US2010-0098901 and converted to N/mm from pounds per inch (lb/in);

(v) Flexibility of no more than 200 N, preferably <175 N, more preferably <150 N (as measured as the average force required to deflect a sample of textile product 1.3 cm as described in the "Hand" method described in paragraph [0074] of US2010-0098901 under "Normal" conditions i.e. at 50% relative humidity (RH) and 22.2° C.) and converted to N from pounds force (lbf)));

(vi) Low shrinkage or expansion of less than 20%, preferably less than 10%, more preferably less than 7%, most preferably less than 5% in any linear dimension of the textile product in the temperature range from −10° C. to 40° C.;

(vii) Reversible adhesion of the HMA adhering the intermediate product and the carrier sheet at temperatures from 100 to 150° C.; and/or (viii) Layer thickness of the HMA less than 1000 g/m², preferably <800 g/m², more preferably <600 g/m², even more preferably <400 g/m², even more preferably <350 g/m².

The following terms are used which have the following meanings as used herein.

The term backing as used herein for example as the primary backing denotes a substantially flat material, suitable for applying yarns to obtain a textile product with yarns that extend there from, typically used for manufacturing floor coverings but in other embodiments may be of use for manufacturing clothing, canvas for tents, household textiles or the like. The application of the yarns may be accomplished by any method such as for example tufting, knitting, weaving, sewing or the like.

Stitched as used herein denotes to fasten or join with or as if with stitches. In general this is an example of a mechanical attachment process in which yarns are joined for example solely by interweaving-like processes (such as tufting, knitting, sewing, stitching, weaving etc.), and not for example by gluing, melting, chemically reacting, otherwise using auxiliary fixing methods to keep the yarns in place.

Reclaim as used herein is synonymous with the term recycle and denotes that a product and/or constituents thereof (such as the textile products of the invention) are capable of being recycled, salvaged, reconditioned, regenerated, converted and/or reprocessed (e.g. by any suitable method such as those described herein) in whole or in part to generate raw materials (such as polymer) than can be reused to make other products, optionally other textile products such as carpets.

Calendering is a finishing process used to make a textile smooth and glossy for example by pressing with or as if with a roller optionally also at high temperature.

Sheets denote a substantially two dimensional mass or material (i.e. a broad and thin, typically, but not necessarily, rectangular). Preferred sheets are flat.

Hot melt adhesives denote thermoplastic adhesives that are designed to be melted, i.e. heated (typically above standard temperature) to transform from a solid state into a liquid state to adhere materials after solidification. Hot melt adhesives are typically non-reactive and comprise low or no amount of solvents so curing and drying are typically not necessary in order to provide adequate adhesion.

Floor coverings denote a textile product that can be used to cover objects such as floors (which term includes walls, ceilings etc.), furniture, the interior of cars, trains, boats, airplanes or the like.

Melting: to heat above a temperature wherein the material reaches a state wherein the material can flow under mere gravitational forces (i.e. being liquid). Heat can be applied using various energy sources such as radiation, convection of hot material such as steam or water, conduction of heat from contact with a hot material, or by applying mechanical forces such as pressure, or a combination of various energy sources.

Dimensionally stable: denotes a substrate having linear dimensions that do not noticeably change by more than 10% (preferably no more than 7%, more preferably no more than 5%) when being exposed to one or more, preferably all of the following conditions: mechanical load (such as walking over it and other load typical for floor coverings for example load of 80 kg/cm² for 24 hours), variation in temperature (e.g. exposure from 0° C. to 160° C. for 24 hours); and/or variation in humidity (e.g. exposure of up to 24 hours under standard conditions at a relative humidity (RH) from 0% to 70%).

Fibre-binding: a process wherein fibres (or yarns) are mechanically locked to a substrate, such that they cannot be removed by simply pulling by hand. Fibre-binding is also denoted as "yarn-binding" in this specification.

Textile is flexible material (usually woven) consisting of a network of natural or artificial fibres often referred to as thread or yarn. Yarn is produced by spinning raw fibres to produce long strands. Textiles may be formed by weaving, knitting, crocheting, knotting, or pressing fibres together (felt). A textile product is a product that comprises a textile with other components such as backing layers, carrier layers and/or adhesives which for example may be used to improve its mechanical and/or other properties. Non limiting examples of textile products comprise carpets, mats, rugs (e.g. hooked rugs) and the like. Mats and rugs are typically loose-laid floor covering whereas carpets (both broad loom and tiles) are typically attached more permanently by methods such as tacks, rods or adhesives onto the surface onto which they are laid (often over an cushioned underlay). Carpets typically comprise an upper layer of pile attached to a backing (where the raised pile fibres are also denoted as the "nap" of the carpet) but may also be flat weave. Carpets can be of various different constructions such as woven, needle felt, knotted, tufted and/or embroidered, though tufted carpets are the most common type. The carpet pile can be made from natural fibres (e.g. wool, cotton and/or jute), synthetic fibres (e.g. polypropylene, polyamide, (for example aliphatic polyamides such as nylons e.g. nylon 6 or nylon 6-6), polyester and/or acrylic) and/or blends of natural and synthetic fibres (e.g. wool blends such as an 80 to 20 blend of wool to synthetic fibre). Often the pile fibres are formed from twisted tufts and may be heat treated to maintain their structure. The pile may be cut (as in a plush carpet) or form loops (as in a Berber carpet). Carpets can be woven on a very wide loom (in which case they referred to as "broad loom carpets") so they can be installed in large areas without seams. Carpets can also be produced in smaller sizes for example as carpet tiles (cut into a tessellating shape, usually a square) which are useful to cover areas such as offices subject to high loads as individual tiles can then easily be replaced if damaged and/or be rearranged to spread wear.

Unless the context clearly indicates otherwise, as used herein plural forms of the terms herein are to be construed as including the singular form and vice versa.

The term "comprising" as used herein will be understood to mean that the list following is non-exhaustive and may or may not include any other additional suitable items, for example one or more further feature(s), component(s), ingredient(s) and/or substituent(s) as appropriate.

In the discussion of the invention herein, unless stated to the contrary, the disclosure of alternative values for the upper and lower limit of the permitted range of a parameter coupled with an indicated that one of said values is more preferred than the other, is to be construed as an implied statement that each intermediate value of said parameter, lying between the more preferred and less preferred of said alternatives is itself preferred to said less preferred value and also to each less preferred value and said intermediate value.

For all upper and/or lower boundaries of any parameters given herein, the boundary value is included in the value for each parameter. It will also be understood that all combinations of preferred and/or intermediate minimum and maximum boundary values of the parameters described herein in various embodiments of the invention may also be used to define alternative ranges for each parameter for various other embodiments and/or preferences of the invention whether or not the combination of such values has been specifically disclosed herein.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non-exhaustive the sum of the percentage for each of such components may be less than 100% to allow a certain percentage for additional amount(s) of any additional component(s) that may not be explicitly described herein.

The term "substantially" as used herein may refer to a quantity or entity to imply a large amount or proportion thereof. Where it is relevant in the context in which it is used "substantially" can be understood to mean quantitatively (in relation to whatever quantity or entity to which it refers in the context of the description) there comprises an proportion of at least 80%, preferably at least 85%, more preferably at least 90%, most preferably at least 95%, especially at least 98%, for example about 100% of the relevant whole. By analogy the term "substantially-free" may similarly denote that quantity or entity to which it refers comprises no more than 20%, preferably no more than 15%, more preferably no more than 10%, most preferably no more than 5%, especially no more than 2%, for example about 0% of the relevant whole.

Compositions of and/or used in the present invention may also exhibit improved properties with respect to known compositions that are used in a similar manner. Such improved properties may be (preferably as defined below) in at least one, preferably a plurality, more preferably three of more of those properties labelled 1 to N below. Preferred compositions of and/or used in the present invention, may exhibit comparable properties (compared to known compositions and/or components thereof) in two or more, preferably three or more, most preferably in the rest of those properties described herein.

Improved properties as used herein denotes the value of the component and/or the composition of and/or used in the present invention is >+8% of the value of the known reference component and/or composition described herein, more preferably >+10%, even more preferably >+12%, most preferably >+15%.

Comparable properties as used herein denotes the value of the component and/or composition of and/or used in the present invention is within +/−6% of the value of the known reference component and/or composition described herein, more preferably +/−5%, most preferably +/−4%.

The percentage differences for improved and comparable properties herein refer to fractional differences between the component and/or composition of and/or used in the invention and the known reference component and/or composition described herein where the property is measured in the same units in the same way (i.e. if the value to be compared is also measured as a percentage it does not denote an absolute difference).

Polymers of the present invention may be prepared by one or more suitable polymer precursor(s) which may be organic and/or inorganic and comprise any suitable (co)monomer(s), (co)polymer(s) [including homopolymer(s)] and mixtures thereof which comprise moieties which are capable of forming a bond with the or each polymer precursor(s) to provide chain extension and/or cross-linking with another of the or each polymer precursor(s) via direct bond(s) as indicated herein.

Polymer precursors of the invention may comprise one or more monomer(s), oligomer(s), polymer(s); mixtures thereof and/or combinations thereof which have suitable polymerisable functionality.

A monomer is a substantially monodisperse compound of a low molecular weight (for example less than one thousand daltons) which is capable of being polymerised.

A polymer is a polydisperse mixture of macromolecules of large molecular weight (for example many thousands of daltons) prepared by a polymerisation method, where the macromolecules comprises the multiple repetition of smaller units (which may themselves be monomers, oligomers and/or polymers) and where (unless properties are critically dependent on fine details of the molecular structure) the addition or removal one or a few of the units has a negligible effect on the properties of the macromolecule.

A oligomer is a polydisperse mixture of molecules having an intermediate molecular weight between a monomer and polymer, the molecules comprising a small plurality of monomer units the removal of one or a few of which would significantly vary the properties of the molecule.

Depending on the context the term polymer may or may not encompass oligomer.

The polymer precursor of and/or used in the invention may be prepared by direct synthesis or (if the polymeric precursor is itself polymeric) by polymerisation. If a polymerisable polymer is itself used as a polymer precursor of and/or used in the invention it is preferred that such a polymer precursor has a low polydispersity, more preferably is substantially monodisperse, to minimise the side reactions, number of by-products and/or polydispersity in any polymeric material formed from this polymer precursor. The polymer precursor(s) may be substantially un-reactive at normal temperatures and pressures.

Except where indicated herein polymers and/or polymeric polymer precursors of and/or used in the invention can be (co)polymerised by any suitable methods of polymerisation well known to those skilled in the art. Examples of suitable methods comprise: thermal initiation; chemical initiation by adding suitable agents; catalysis; and/or initiation using an optional initiator followed by irradiation, for example with electromagnetic radiation (photo-chemical initiation) at a suitable wavelength such as UV; and/or with other types of radiation such as electron beams, alpha particles, neutrons and/or other particles.

The substituents on the repeating unit of a polymer and/or oligomer may be selected to improve the compatibility of the materials with the polymers and/or resins in which they may be formulated and/or incorporated for the uses described herein. Thus the size and length of the substituents may be selected to optimise the physical entanglement or interlocation with the resin or they may or may not comprise other reactive entities capable of chemically reacting and/or cross linking with such other resins as appropriate. Preferred substituents are organic substituents.

Other conventional terms from polymer science that are used herein (such as polymer, monomer, oligomer etc.) shall have those meanings recommended by IUPAC and as defined in Pure Appl. Chem., Vol. 68, No. 12, pp. 2287-2311, 1996, the contents of which are incorporated herein by reference.

The terms 'optional substituent' and/or 'optionally substituted' as used herein (unless followed by a list of other substituents) signifies the one or more of following groups (or substitution by these groups): carboxy, sulfo, formyl, hydroxy, amino, imino, nitrilo, mercapto, cyano, nitro, methyl, methoxy and/or combinations thereof. These optional groups include all chemically possible combinations in the same moiety of a plurality (preferably two) of the aforementioned groups (e.g. amino and sulfonyl if directly attached to each other represent a sulfamoyl group). Preferred optional substituents comprise: carboxy, sulfo, hydroxy, amino, mercapto, cyano, methyl, halo, trihalomethyl and/or methoxy.

The synonymous terms 'organic substituent' and "organic group" as used herein (also abbreviated herein to "organo") denote any univalent or multivalent moiety (optionally attached to one or more other moieties) which comprises one or more carbon atoms and optionally one or more other heteroatoms. Organic groups may comprise organoheteryl groups (also known as organoelement groups) which comprise univalent groups containing carbon, which are thus organic, but which have their free valence at an atom other than carbon (for example organothio groups). Organic groups may alternatively or additionally comprise organyl groups which comprise any organic substituent group, regardless of functional type, having one free valence at a carbon atom. Organic groups may also comprise heterocyclyl groups which comprise univalent groups formed by removing a hydrogen atom from any ring atom of a heterocyclic compound: (a cyclic compound having as ring members atoms of at least two different elements, in this case one being carbon). Preferably the non-carbon atoms in an organic group may be selected from: hydrogen, halo, phosphorus, nitrogen, oxygen, silicon and/or sulphur, more preferably from hydrogen, nitrogen, oxygen, phosphorus and/or sulphur.

Most preferred organic groups comprise one or more of the following carbon containing moieties: alkyl, alkoxy, alkanoyl, carboxy, carbonyl, formyl and/or combinations thereof; optionally in combination with one or more of the following heteroatom containing moieties: oxy, thio, sulfinyl, sulfonyl, amino, imino, nitrilo and/or combinations thereof. Organic groups include all chemically possible combinations in the same moiety of a plurality (preferably two) of the aforementioned carbon containing and/or heteroatom moieties (e.g. alkoxy and carbonyl if directly attached to each other represent an alkoxycarbonyl group).

The term 'hydrocarbo group' as used herein is a sub-set of an organic group and denotes any univalent or multivalent moiety (optionally attached to one or more other moieties) which consists of one or more hydrogen atoms and one or more carbon atoms and may comprise one or more saturated, unsaturated and/or aromatic moieties. Hydrocarbo groups may comprise one or more of the following groups. Hydrocarbyl groups comprise univalent groups formed by removing a hydrogen atom from a hydrocarbon (for example alkyl). Hydrocarbylene groups comprise divalent groups formed by removing two hydrogen atoms from a hydrocarbon, the free valencies of which are not engaged in a double bond (for example alkylene). Hydrocarbylidene groups comprise divalent groups (which may be represented by "$R_2C=$") formed by removing two hydrogen atoms from the same carbon atom of a hydrocarbon, the free valencies of which are engaged in a double bond (for example alkylidene). Hydrocarbylidyne groups comprise trivalent groups (which may be represented by "$RC\equiv$"), formed by removing three hydrogen atoms from the same carbon atom of a hydrocarbon the free valencies of which are engaged in a triple bond (for example alkylidyne). Hydrocarbo groups may also comprise saturated carbon to carbon single bonds (e.g. in alkyl groups); unsaturated double and/or triple carbon to carbon bonds (e.g. in respectively alkenyl and alkynyl groups); aromatic groups (e.g. in aryl groups) and/or combinations thereof within the same moiety and where indicated may be substituted with other functional groups The term 'alkyl' or its equivalent (e.g. 'alk') as used herein may be readily replaced, where appropriate and unless the context clearly indicates otherwise, by terms encompassing any other hydrocarbo group such as those described herein (e.g. comprising double bonds, triple bonds, aromatic moieties (such as respectively alkenyl, alkynyl and/or aryl) and/or combinations thereof (e.g. aralkyl) as well as any multivalent hydrocarbo species linking two or more moieties (such as bivalent hydrocarbylene radicals e.g. alkylene).

Any radical group or moiety mentioned herein (e.g. as a substituent) may be a multivalent or a monovalent radical unless otherwise stated or the context clearly indicates otherwise (e.g. a bivalent hydrocarbylene moiety linking two other moieties). However where indicated herein such monovalent or multivalent groups may still also comprise optional substituents. A group which comprises a chain of three or more atoms signifies a group in which the chain wholly or in part may be linear, branched and/or form a ring (including spiro and/or fused rings). The total number of certain atoms is specified for certain substituents for example $C_{1-N}$organo, signifies a organo moiety comprising from 1 to N carbon atoms. In any of the formulae herein if one or more substituents are not indicated as attached to any particular atom in a moiety (e.g. on a particular position along a chain and/or ring) the substituent may replace any H and/or may be located at any available position on the moiety which is chemically suitable and/or effective.

Preferably any of the organo groups listed herein comprise from 1 to 36 carbon atoms, more preferably from 1 to 18. It is particularly preferred that the number of carbon atoms in an organo group is from 1 to 12, especially from 1 to 10 inclusive, for example from 1 to 4 carbon atoms.

As used herein chemical terms (other than IUAPC names for specifically identified compounds) which comprise features which are given in parentheses—such as (ar)alkyl, and/or (co)polymer—denote that that part in parentheses is optional as the context dictates, so for example the term (co)polymer denotes both copolymer and polymer.

The substituents on the repeating unit of a polymer and/or oligomer may be selected to improve the compatibility of the materials with the polymers and/or resins in which they may be formulated and/or incorporated for the uses described herein. Thus the size and length of the substituents may be selected to optimise the physical entanglement or interlocation with the resin or they may or may not comprise other reactive entities capable of chemically reacting and/or cross-linking with such other resins as appropriate.

Certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers (such as enantiomers (e.g. E and/or Z forms), diastereoisomers and/or geometric isomers); tautomers (e.g. keto and/or enol forms), conformers, salts, zwitterions, complexes (such as chelates, clathrates, crown compounds, cyptands/cryptates, inclusion compounds, intercalation compounds, interstitial compounds, ligand complexes, organometallic complexes, non-stoichiometric complexes, π-adducts, solvates and/or hydrates); isotopically substituted forms, polymeric configurations [such as homo or copolymers, random, graft and/or block polymers, linear and/or branched polymers (e.g. star and/or side branched), cross-linked and/or networked polymers, polymers obtainable from di and/or trivalent repeat units, dendrimers, polymers of different tacticity (e.g. isotactic, syndiotactic or atactic polymers)]; polymorphs (such as interstitial forms, crystalline forms and/or amorphous forms), different phases, solid solutions; and/or combinations thereof and/or mixtures thereof where possible. The present invention comprises and/or uses all such forms which are effective as defined herein.

The formula(e) herein may represent a polymeric mixture or a series of discrete compounds. If the formula(e) herein represent species which are monodisperse (such as compounds) then the values of any numerical variables denoted therein (such as 'n' and the like, for example denoting the number of repeat units) are independently an integer (or zero if the context allows) within the specified range. If the formula represents the average structure of many discrete species present in a polydisperse oligomeric and/or polymeric mixture then the numerical values of any variables shown in the formula may be real, non-integer, numbers with the specified ranges.

The terms 'effective', 'acceptable' 'active' and/or 'suitable' (for example with reference to any process, use, method, application, preparation, product, material, formulation, compound, monomer, oligomer, polymer precursor, and/or polymers of the present invention and/or described herein as appropriate) will be understood to refer to those features of the invention which if used in the correct manner provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing effective, acceptable, active and/or suitable end products.

Preferred utility of the present invention comprises use of the polymers described herein to prepare adhesive compositions laminated textile products, for example floor coverings such as carpet, carpet tiles, rugs and mats.

There is an increasing demand to use bio renewable materials in order to improve the sustainability of the resins used in for example adhesive applications. In view of concerns about depletion of fossil fuel resources or an increase in carbon dioxide in the air that poses a global scale environmental problem in recent years, methods for producing raw materials of these polymers from biomass resources have attracted a lot of attention. Since these resources are renewable and therefore have a carbon neutral biomass, such methods are expected to gain in particular importance in future. It is therefore a preferred feature of the present invention and the aspects described herein that where possible the components used herein as far as possible are biorenewable.

Preferably at least 20 wt-%, more preferably at least 30 wt-%, and especially at least 40 wt-% of the components used to form the polymer P used in the invention may be derived from at least one bio renewable material. Bio renewable materials may be obtained fully or in part from bio renewable sources. Thus it is preferred to also measure the carbon 14 content to determine the biorenewability content of the components of the polymer P and/or the hot melt adhesive. The term bio-based is also used herein as a synonym for bio-renewable (as defined herein).

The content of carbon 14 (C 14) is indicative of the age of a bio based material. It is known in the art that C 14, which has a half-life of about 5,700 years, is found in bio renewable materials but not in fossil fuels. Thus, "bio renewable materials" refer to organic materials in which the carbon comes from non-fossil biological sources. Examples of bio renewable materials include, but are not limited to, sugars, starches, corns, natural fibres, sugarcanes, beets, citrus fruits, woody plants, cellulosics, lignocelluosics, hemicelluloses, potatoes, plant oils, other polysaccharides such as pectin, chitin, levan, and pullulan, and a combination thereof. C 14 levels can be determined by measuring its decay process (disintegrations per minute per gram carbon or dpm/gC) through liquid scintillation counting. In one embodiment of the present invention, polymer A and or polymer B comprise at least about 1.5 dpm/gC (disintegrations per minute per gram carbon) of carbon 14, more preferably at least 2 dpm/gC, most preferably at least 2.5 dpm/gC, and especially at least 4 dpm/gC.

Many other variations embodiments of the invention will be apparent to those skilled in the art and such variations are contemplated within the broad scope of the present invention.

Further aspects of the invention and preferred features thereof are given in the claims herein. It will also be understood that (whether or not explicitly stated by the claim dependencies herein) any or all of the textile products of the invention such as those obtained and/or obtainable from any or all methods of manufacturing textile products described in the description herein and/or in the claims herein (including any optional features such as those described in the description herein and/or in any dependent claims herein) may also be used in any or all other aspects of the present invention (such as other methods and uses) also described in the description herein and/or in any and all of the claims herein.

Test Methods:

Unless otherwise indicated all the tests herein are carried out under standard conditions as also defined herein.

Glass Transition Temperature (Tg)

The Tg was measured by DSC using the TA Instruments DSC Q1000 with the standard TA Instruments alumina cups of 50 µl. The flow rate was 50 ml/min of nitrogen and the sample was loaded at a temperature range 20 to 25° C. The sample was then cooled to −20° C., at −20° C. the sample is heated to 200° C. at a rate of 5° C./min. Where the Tg could not be measured experimentally the Tg of a polymer may also be calculated theoretically using the well-known Fox equation where the Tg (in Kelvin) of a copolymer having "n" copolymerised comonomers is given by the weight fractions "W" and the Tg values of the respective homopolymers (in Kelvin) of each comonomer type according to the equation "$1/Tg=W_1/Tg_1+W_2/Tg_2+ \ldots W_n/Tg_n$". The calculated Tg in Kelvin may be readily converted to ° C.

Melt Viscosity

The melt viscosity was measured by Rheometer using the Anton Paar Physica MCR 301 with a plate/plate 25 mm spindle. A nitrogen 250 In/h overflow was used during the measurements. The gap distance was set for 0.5 mm. Samples were heated to 200° C. At 200° C. cooling is started with 4° C./min. During cooling viscosity is measured with a share rate of 5 $s^{-1}$.

Molecular Weight

Unless the context clearly dictates otherwise the term molecular weight of a polymer or oligomer as used herein denotes weight average molecular weight (also denoted as Mw). Mw may be measured by any suitable conventional method for example by Gas Phase Chromatography (GPC—performed similarly to the GCMS method described above) and/or by the SEC method described below. GPC method is preferred. The number average molecular weight (also denoted as Mn) may also be determined by a similar method to that for Mw and/or may be calculated theoretically.

Determination of Weight Average Molecular Weight (Mw) of a Polymer Using SEC

The Mw of a polymer may be determined using Size Exclusion Chromatography (SEC) with tetrahydrofuran as the eluent or with 1,1,1,3,3,3 hexafluoro isopropanol as the eluent.

1) Mw by SEC with Tetrahydrofuran Eluent

The SEC analyses were performed on an Alliance Separation Module (Waters 2690), including a pump, auto injector, degasser, and column oven. The eluent was tetrahydrofuran (THF) with the addition of 1.0 vol % acetic acid. The injection volume was 150 µl. The flow was established at 1.0 ml/min. The sample to be tested was applied to three PL Mixed B SEC columns (from Polymer Laboratories) with a guard column (3 µm PL) at a temperature of 40° C. The detection was performed with a differential refractive index detector (Waters 410). The sample solutions were prepared with a concentration of 20 mg solids in 8 ml THF (+1 vol % acetic acid), and the samples were dissolved for a period of 24 hours. Calibration is performed with eight polystyrene standards (polymer standard services), ranging from 500 to 4,000,000 g/mol. The calculation was performed with Millennium 32 software (Waters) with a third order calibration curve. The obtained molar masses are polystyrene equivalent molar masses (g/mol).

2) Mw by SEC with 1,1,1,3,3,3 Hexafluoro Isopropanol as Eleuent

The SEC analyses were performed on a Waters Alliance 2695 (pump, degasser and autosampler) with a Shodex RI 101 differential refractive index detector and Shimadzu CTO 20AC column oven. The eluent was 1,1,1,3,3,3 hexafluoro isopropanol (HFIP) with the addition of 0.2M potassium trifluoro acetate (KTFA). The injection volume was 50 µl. The flow was established at 0.8 ml/min. Two PSS PFG Linear XL columns (Polymer Standards Service) with a guard column (PFG PSS) were applied at a temperature of 40° C. The detection was performed with a differential refractive index detector. The sample solutions were prepared with a concentration of 5 mg solids in 2 ml HFIP (+0.2M KTFA), and the samples were dissolved for a period of 24 hours. Calibration is performed with eleven polymethyl methacrylate standards (polymer standard services), ranging from 500 to 2,000,000 g/mol. The calculation was performed with Empower Pro software (Waters) with a third order calibration curve. The molar mass distribution is obtained via conventional calibration and the molar masses are polymethyl methacrylate equivalent molar masses (g/mol).

Standard Conditions

As used herein, unless the context indicates otherwise, standard conditions (e.g. for drying a film) denotes a relative humidity of 50%±5%, ambient temperature (23° C.±2°) and an air flow of ☐ (less than or equal to) 0.1 m/s.

Tackiness Time (TFT):

The time during which an composition remained tacky (tackiness time) was determined by placing a piece of cotton wool (about 1 cm3, 0.1 g) on the drying film and placing a weight of 1 kg with a diameter 4.8 cm onto the piece of cotton wool (for 10 seconds). If the piece of cotton wool could be removed from the substrate by hand without leaving any wool or marks in or on the film, the film was considered to be no longer tacky (tack-free) and the time taken for the film to become tack-free is recorded as the tackiness time.

EXAMPLES

The present invention will now be described in detail with reference to the following non-limiting examples which are by way of illustration only. The amount of each component is given in brackets as a relative part by weight of total of components below.

Example A (Polyester Adhesive)

A polyester was prepared using a standard polyester synthesis as described below.

The ingredients 1,6-hexanediol (533 g), terephthalic acid (423 g), n-butyl chloro tin (IV) dihydrate (0.05 g) and distearyl pentaerythritol diphosphite. (0.08 g) were heated in a reactor at 240° C. Water produced from the reaction was removed until the acid number of the mixture was less than 2 mg KOH/g and then the reactor was cooled to 180° C. Fumaric acid (194 g), n-butyl chloro tin (IV) dihydrate (0.05 g) and mono tert butyl (MTB) hydrochinon (0.2 g) were added to the reactor and the mixture was heated to 210° C. Water from the reaction was removed until the acid number of the mixture was less than 30 mg KOH/g and then the reactor was cooled to 180° C. The remaining water removed under reduced pressure until the acid number was less than 4 mg KOH/g to produce a polyester characterised as follows: Hydroxyl value=22.1 mg KOH/g, Acid value AV=3.6 mg KOH/g; crystallisation temperature $T_c$=59° C.; viscosity 8.0 Pa·s at 150° C.

Examples B to G described below are polyesters (PEs) prepared analogously to the method described above for Example A using the ingredients shown in Table 1 (amounts as mols)

TABLE 1

Polyester hot melt adhesives

| Example | HD | BD | EG | TPA | ScA | FA | AdA |
|---|---|---|---|---|---|---|---|
| B | 10.7 | — | — | 5.48 | 4.52 | — | — |
| C | 10.7 | — | — | 7.50 | — | — | 2.50 |
| D | 9.31 | — | 1.49 | 10.0 | — | — | — |
| E | 10.7 | — | — | 5.87 | — | — | 4.13 |
| F | — | 10.7 | — | 4.50 | — | — | 5.50 |
| G | 10.7 | — | — | 6.04 | — | 3.96 | — |

In table 1, HD denotes 1,6-hexanediol, BD denotes 1,4-butane diol, EG denotes ethylene glycol, TPA denotes terephthalic acid, ScA denotes succinic anhydride; FA denotes fumaric acid and AdA denotes adipic acid.

Polyesters B and F can also be prepared by any suitable methods known to those skilled in the art. For example Polyesters E and F may be prepared by a method analogous to any of the methods described to prepare any of the examples of polyester hot melt adhesives described in US 2010-122250 (for example Example 1 in paragraph [0161], Example 1B in paragraph [0162] and/or Example 10 in paragraph [0163])

Example 1 (Carpet Tile—Nylon-polyester Laminate)

The polyester adhesive of Example A may be used to prepare a nylon tufted carpet tile as follows. Nylon-6 fibres are woven in a nylon-6 primary backing. Fibre loops are anchored by the ultrasonic binding method described in WO 2012/076348 (Niaga). When the fibre loops are still hot (150° C.) a carrier layer of polyester is attached to the primary backing with the molten crystalline polyester adhesive prepared in Example 1 applied at a temperature of from 120 to 150° C. A recyclable durable nylon-6 carpet tile is obtained.

The carpet tile can be recycled by heating to a temperature from 100 to 120° C. when the hot melt polyester adhesive softens and the nylon tufts and nylon primary backing can be released from polyester carrier.

Example 2 (Carpet Tile—Polyester Laminated)

A carpet tile with polyester tufts can be prepared analogously to Example 1, replacing the nylon-6 tufts and nylon-6 primary backing with polyester tufts and polyester primary backing. The result is a durable, recyclable laminated carpet tile that consists solely of polyester. The polyester tile can be recycled by heating from 100 to 120° C. to soften the polyester adhesive and separate the tufts and primary backing from the carrier. Alternatively the as the carpet tile has only polyester components it can optionally be recycled without a separation step by any known method used to degrading polyester.

Comparative Example I (Carpet Tile—Nylon-polyester Laminate Poor Anchorage)

A nylon polyester carpet tile is prepared analogously to as described in Example 1, except the ultrasonic binding method described in WO 2012/076348 is omitted so the tufts are permanently bound only by the Polyester adhesive A. Although recyclable the resultant carpet tiles have poor durability as the tufts are readily removed under mechanical loads.

Further textile products of the invention may be prepared in an analogous manner to that described in Example 1 using the materials shown in the table below.

Examples 3 to 5

Further examples (Ex 3 to 5) of textile products of the invention are in Table 2 below

TABLE 2

| | Example | | |
|---|---|---|---|
| | 3 | 4 | 5 |
| | | Mols | |
| Hexane diol: | 10.7 | 10.7 | 93.1 |
| Ethylene glycol: | — | — | 1.49 |
| Terephthalic acid | 6.04 | 7.50 | 10.0 |
| Fumaric acid | 3.96 | — | — |
| Adipic acid | — | 2.50 | — |
| Adhesion 100% PE | +++++ | +++++ | +++++ |
| Adhesion 100% PE | +++++ | +++++ | |
| Adhesion PA/PE | | ++++ | +++++ |
| Adhesion 100% PE tile test | + | +++++ | +++ |
| Adhesion PA/PE tile test | + | +++++ | +++ |
| Broadloom application | Yes | Yes | Yes |
| 100% PE carpet tile application | No | Yes | No |
| PA/PE carpet tile application | No | Yes | No |
| AV | 3.6 | 4.2 | 3 |
| OHV | 22.1 | 4.9 | 21.1 |
| Mn | 6300 | 12500 | NM |
| Mw | 14500 | 32500 | NM |
| Polydispersity. | 2.3 | 2.6 | NM |

TABLE 2-continued

| | Example | | |
|---|---|---|---|
| | 3 | 4 | 5 |
| | | Mols | |
| Viscosity 150° C. | 8 | 45 | 12 |
| Viscosity 200° C. | 1 | 16 | 4 |
| Tg (° C.) (−50-150 @ 5° C./min) | −4.8/36.9 | −17/32 | 1 |
| Tm (° C.)(−50-150 @ 5° C./min) | 72/91 | 108/118 | 121/133 |
| T crystallisation Rheometer | 59° C. | 90° C. | 104° C. |

(NM denotes not measured)

Examples 3 and 5 are particularly suitable for use as broad loom carpets and Example 3 is particularly suitable for use as carpet tiles whether 100% polyester (PE) or a laminate of polyamide (PA) and polyester (PE), although may also be used as a broad loom carpet. In each of the examples the machine settings are adjusted to result in good penetration of the glue into the primary backing. With the teaching herein it is possible to prepare analogous textile products to those of the examples herein (e.g. Examples 3 to 5) to optimise molecular weight and raw materials so that the textile products comprise glues which are 100% polyester and are suitable either as broad loom carpets and/or as carpet tiles.

Example 6

A textile product was prepared as described for Example 3 using as the hot melt glue a semi crystalline sulfo-functional polyester prepared from an additional ingredient of 5-(sodiosulfo)isophthalic acid (SSIPA) added in an amount of 6% by mass of total mass of other ingredients used to prepare the PE. It is believed that such semi crystalline sulfo functional PE glues may have the additional benefit of reducing the build-up of static electric charge in the textile product.

The invention claimed is:

1. A hot melt adhesive comprising a polymer P in an amount of at least 50% by weight of the hot melt adhesive composition, wherein
    the polymer P is a polyester which is a condensation polymerization reaction product of a dicarboxylic acid and a polyol having two hydroxyl groups per molecule, and wherein
    the polymer P is semi-crystalline and has a melting point from 75 to 150° C., a glass transition temperature below 40° C. and a melt viscosity at 150° C. of lower than 100 Pa·s and higher than 8 Pa·s, wherein
    the hot melt adhesive is thermoplastic.

2. The hot melt adhesive according to claim 1, wherein the dicarboxylic acid is terephthalic acid, fumaric acid and/or adipic acid.

3. The hot melt adhesive according to claim 1, wherein the polyol is ethylene glycol and/or 1,6-hexanediol.

4. The hot melt adhesive according to claim 1, wherein the melt viscosity of polymer P at 150° C. is higher than 12 Pa·s.

5. The hot melt adhesive according to claim 1, wherein polymer P has a melting point of polymer P is from 75 to 130° C.

6. The hot melt adhesive according to claim 1, wherein the polyester is a condensation polymerization reaction product of at least one dicarboxylic acid selected from the group consisting of terephthalic acid, adipic acid and fumaric acid, with at least one alcohol selected from the group consisting of ethylene glycol and 1,6-hexanediol.

* * * * *